(12) United States Patent
Nuyttens et al.

(10) Patent No.: US 9,264,678 B2
(45) Date of Patent: Feb. 16, 2016

(54) NETWORK DISPLAYS AND METHOD OF THEIR OPERATION

(71) Applicant: BARCO N.V., Kortrijk (BE)

(72) Inventors: Geert Nuyttens, Bissegem (BE); Ronny Dewaele, Zonnebeke (BE)

(73) Assignee: BARCO N.V., Kortrijk (BE)

( * ) Notice: Subject to any disclaimer, the term of this patent is extended or adjusted under 35 U.S.C. 154(b) by 530 days.

(21) Appl. No.: 13/741,681

(22) Filed: Jan. 15, 2013

(65) Prior Publication Data

US 2014/0028907 A1   Jan. 30, 2014

Related U.S. Application Data

(62) Division of application No. 11/487,357, filed on Jul. 17, 2006, now Pat. No. 8,375,301.

(30) Foreign Application Priority Data

Jul. 15, 2005  (GB) .................................. 0514568.5
Sep. 9, 2005  (GB) .................................. 0518429.6

(51) Int. Cl.
*H04N 9/12* (2006.01)
*H04N 7/18* (2006.01)

(52) U.S. Cl.
CPC . *H04N 9/12* (2013.01); *H04N 7/181* (2013.01)

(58) Field of Classification Search
CPC .......... H04N 21/234363; H04N 19/00; H04N 21/23439; H04N 21/2365; H04L 65/60; H04L 65/607; G11B 27/32
USPC ......................................... 715/717–726, 736
See application file for complete search history.

(56) References Cited

U.S. PATENT DOCUMENTS

| | | |
|---|---|---|
| 5,307,456 A | 4/1994 | MacKay |
| 6,081,263 A | 6/2000 | LeGail et al. |
| 6,160,544 A | 12/2000 | Hayashi et al. |
| 6,360,234 B2 | 3/2002 | Jain et al. |
| 6,760,916 B2 | 7/2004 | Holtz et al. |
| 7,380,260 B1 | 5/2008 | Billmaier et al. |
| 2005/0022135 A1 | 1/2005 | De Waal |
| 2006/0026511 A1 | 2/2006 | Rainero et al. |

FOREIGN PATENT DOCUMENTS

| | | |
|---|---|---|
| WO | WO 01/13637 | 2/2001 |
| WO | WO 01/76226 | 10/2001 |

OTHER PUBLICATIONS

Official communication dated Dec. 19, 2013 in European Application No. 06 447 092.5-1902.

*Primary Examiner* — Peiyong Weng
(74) *Attorney, Agent, or Firm* — Bacon & Thomas, PLLC

(57) ABSTRACT

A digital networked studio and the needed software services to allow the use of the system for monitoring the creation and distribution processes of real-time created content is described.

Distribution problems are solved using an off-the-shelf network, e.g. using an IP based or similar data protocol, such as an IP network based distributed system architecture to bring the display controller functionality closer to the source and to replace proprietary busses used for transporting video, audio, RGB, graphical information and/or metadata with building blocks based on standard IP and compression technologies. A characteristic of such a network is to use unicast, multicast and/or broadcast technologies (based on network addresses) and to route data from one address to another. The network provides redundancy in case any of the digital generation units.

17 Claims, 22 Drawing Sheets

Fig. 1 – PRIOR ART

Length: Length of the synchronization packet in words
(4 bytes)
Actually length = 2, may be enhanced later
on, if necessary
Res: Reserved for future use
FR: Frame Rate
Frame rate in microseconds, gives the time difference
between two successive frames
IFC: Input Frame Counter
Input frame counter, incremented for every frame, can
be used to load the Output Frame Counter

NETWORK DISPLAYS AND METHOD OF THEIR OPERATION

This application is a divisional of allowed U.S. patent application Ser. No. 11/487,357, filed Jul. 17, 2006, and incorporated by reference herein.

TECHNICAL FIELD OF THE INVENTION

The present inventions relate to multi-head display controllers and multi-head displays as well as methods of operating these displays, e.g. as used during pre-sports events and in-sports events phases of operation for metadata, process and broadcast monitoring purposes. The term "multi-head" refers to using more than one display unit, e.g. monitor, side-by-side to create a very large logical desktop. A multiple of display units, e.g. monitors, may display a multiple of different video and/or RGB images and related and/or embedded metadata (such as video characteristics or embedded audio), for example, as e.g. in broadcast studios, utilities control rooms or air traffic control. The present invention also relates to all applications for multi-screen large area displays or applications where parts of the same information have to be shown synchronously on multiple display units. Typical applications are broadcast, telecommunications, utilities, transportation, security, defense, process control, simulation and others.

BACKGROUND OF THE INVENTION

The need for increased functionality of display controllers—preferably at lower prices—drives product evolution in ever-shorter cycles. Over the years it has been shown that an increase in display controller functionality requires an even faster increase in internal bus bandwidth. Initial hardware designs used 'point to point' connectivity. The advent of IT hardware caused proprietary bus structures to appear. Standardization of the IT market generated a fast evolution of cheap standard bus designs. High-end requirements were fulfilled with proprietary busses, often driving future standards forward.

First generations of multi-head display controllers focused on the display of graphics data. Standard bus based system could handle this well. The emerging demand for showing video and/or RGB images and related and/or embedded metadata was handled by either limiting the data rate caused by video data transfer on a standard bus (leading to lower quality) or by using additional proprietary busses. The need for higher numbers of higher quality video/RGB images and more powerful video and metadata processing grew stronger and caused the design of highly complex bus solutions (most of the time still based upon existing standards).

A similar evolution was noted in IT networking. Low-speed networking evolved very rapidly over the years towards very high-speed networking—10 Gbit/sec data rate being readily available, 1 Gbit/sec already becoming standard for high-end workstations and laptops, 100 Mbit/sec almost being outdated. Switch and router bus capacities were driven by the ever-faster network speed and QoS requirements—nowadays guaranteeing sufficient processing and transfer capacity to avoid packet loss. At the same time there has been an evolution in compression technology—MPEG, MPEG2, MPEG4, JPEG, JPGEG2000 . . . —to yield higher compression rate for the same visible quality of images.

Today, more and more customers demand solutions where the distribution is done of multiple sources in different locations, with sources being of multiple signal types, to different places where display units 1 such as projectors, plasma displays, monitors are available. Today this can be solved with presently available display controllers 2 (such as e.g. Hydra or Argus, available from the applicant for the present patent). The classical system architecture, however, has the disadvantage that one display controller 2, e.g. a Hydra multi-viewer display controller, drives one display unit 1 (which may consist of multiple screens). One can easily come to a stage where one such display controller 2 is not big enough to drive a display unit 1 or where multiple display controllers in different locations are required to display the same sources. In this case, an external distribution device 3, such as a router or matrix switch, e.g. CVBS/SDI/RGB routers, is required to enable the switching and multiplexing of input signals to several destinations, as illustrated in FIG. 1. This architecture has the disadvantage that every display controller 2 needs to be connected to the external distribution device 3, e.g. router, by as many cables as there are images to be displayed on a single display unit 1 (screen). Cabling therefore is a major issue. It is furthermore a disadvantage of such implementation that the external video/audio distribution in the central external distribution device 3, required to bring the input source signals to the relevant display controllers 2 is a high cost (amplifiers, matrix switchers, cabling, . . . ). Another disadvantage, as already indicated, is the fact that the distribution internally in the display controller requires ever more complex bus solutions.

In the particular case of a control room, e.g. a broadcast studio, utilities control room or an air traffic control tower operations room, such control room is equipped with a multitude of displays, in the latter case allowing one or more air traffic controllers to monitor the air and ground traffic, landings and all vehicle movements on the runway and the apron. Most of today's systems used in a traffic control environment are based on the principle of "one monitor for one application", in a static configuration. Every display has its proper mouse and keyboard, and is thus dedicated to one particular application or system. Consequently, the human machine interface is composed of several displays, of different sizes and shapes, with each its own user interface. This situation is sub-optimum from an ergonomic perspective. Existing solutions using KVM switches fall short in providing the required functionality when operators demand simultaneous viewing and interoperability with applications running on multiple application servers.

There is room for improvement in multi-head display controllers and multi-head displays.

SUMMARY OF THE INVENTION

It is an object of the present invention to provide good apparatus or methods for displaying images on a display system comprising a plurality of display units.

The above objective is accomplished by methods and devices according to the present invention.

The present invention provides a display system for displaying streaming image data, comprising:
display generator units each comprising a processing means and a memory,
a shared resource network linking the display generator units, the shared resource network being adapted to receive a plurality of input source signals encoding images to be displayed,
a plurality of display units, the display units being for display of at least some of the images encoded in the input source signals, wherein each display generator unit is adapted for storing a configuration document (61), the configuration document including a definition of a task of all display generator units.

This provides the advantage of the use of a shared resource network. The shared resource network can be a local or wide area network. No proprietary busses are needed and hence dependencies on physical limitations, common to high-speed busses, are relaxed. The cost can be lower, less cabling being necessary. Management of IT networking equipment is common knowledge for IT departments, therefore the system is easier to manage. A configuration document controls video streams as to how these are displayed. One configuration document for all DGUs provides local graphics configuration for the DGU's and makes the DGUs independent from any central processor. This allows the DGU's to render different parts of the image in parallel at full speed.

An additional feature of the present invention is that each display generator unit has a filter to filter out or extract tasks assigned to that display generator unit. This has the advantage that swapping between devices is possible in case of fault on one processing device. The new device is able to filter out other information.

The configuration document may be or may contain a tagged mark-up language description of the image to be displayed. Languages/formats/styles such as SGML, XML, SVG can be used, for example. These languages allow specification of objects and attributes that allow swapping between devices in case of fault on one processing device. Any new device can filter out other information from such documents.

The system may comprise a control unit for controlling distribution of the configuration document to the display generator units.

Optionally, the processing means of the display generator units may comprise a gaming video processor for rendering the images to be displayed. This provides fast rendering of images. On the fly rendering is also enabled.

As a further feature, the display generator unit may comprise local synchronisation means for synchronising operations within a display generator unit. In addition global synchronisation means may be provided for synchronising operation of a plurality of display generator units. Then different display units all display the same output frame at a same moment in time, so that for an image over a plurality of display units no errors are noticed.

Preferably, there is a single configuration document for all images to be displayed on the plurality of display units. This provides the advantage of redundancy. As all display units are controlled by the same configuration file, any display unit can take over for any of the others, combination of the others or all others if so desired.

Encoders may be provided for encoding image data to be displayed so as to generate the input source signals. These encoders may comprise coder logic for compressing data related to images to be displayed. For example, the codec logic can be a JPEG2000 logic.

A further feature of the present invention is that each display generator unit is adapted for subscribing—e.g. either by listening to the unicast network (e.g. IP) address used to transmit the compressed data or by listening to the multicast group used to distribute the information—to multiple sources of image data to be displayed.

The display generator units may comprise decoder logic for decompressing data related to images to be displayed. The decoder logic can be a JPEG2000 logic, for example.

The display generator units may furthermore comprise means for reading multimedia information and for filling it into the data stream of the image to be displayed.

To provide additional flexibility, there can be at least one redundant display generator unit, i.e. at least one more than the number of display generator units required to provide the image data for the display units. Each display unit can have a first and a second input, the first input being for connection to a display generator unit and the second input being for linking to the at least one redundant display generator unit, each display unit furthermore having a switch for switching between the first and second inputs.

Optionally, a display generator unit can be integrated into a display unit. In another aspect the present invention provides a display system for displaying streaming image data, comprising:

a plurality of display units, display generator units for generation of display data for the plurality of display units, a shared resource network linking the display generator units, the shared resource network being adapted to receive a plurality of input source signals encoding images to be displayed, wherein there is at least one redundant display generator unit in excess of the number of display generator units required to provide the image data for the display units, wherein each display unit (15) has a first and a second input, the first input being for connection to a display generator unit, and the second input being for linking to the at least one redundant display generator unit, each display unit furthermore having a switch for switching between the first and second input. The shared resource network can be a local area network or a wide area network. The network may be wired, wireless, optical, etc. as required. If one display generator unit fails, its function can be seamlessly taken over by the redundant one. This provides fault tolerance against failure, even without using a central logic processor.

A loop-through connection can be provided for connecting the second inputs of the display units to the at least one redundant display generator unit. Each display generator unit may be adapted for storing a configuration document, the configuration document including a definition of tasks for all display generator units. The configuration document may comprise a full description of the image content of each of the display units. The full description may be defined in the document by means of a network address for the display unit to be used.

The configuration document may be or may contains a tagged mark-up language description of the image to be displayed. Examples are SGML, XML, SVG documents. Using the configuration document swapping between devices is possible in case of a fault on one processing device. The new device can filter out other information not relevant to its new task using the information in the configuration document.

Accordingly, each display generator unit can have a filter to filter out from the configuration document tasks assigned to that display generator unit. This provides the advantage that each DGU is thereby capable of defining its active role within the display wall. Swapping between devices is possible in case of fault on one processing device as the new device can filter out the relevant information for the new display role and also ignore other information.

Preferably, a single configuration document is used to define all images to be displayed on the plurality of display units. This is a convenient way of providing redundancy as every display unit can take over the role of any of the others, some of the others or even for all others if so desired.

Preferably a control unit is provided for controlling distribution of the configuration document to the display generator units.

Another feature of the present invention is that each display generator unit is adapted for subscribing to sources of image data to be displayed.

Another feature of the present invention is that the processing means of the display generator units comprises a gaming video processor for rendering the images to be displayed. This provides fast rendering of images and on the fly rendering is possible.

Another feature of the present invention is that the display generator unit comprises local synchronisation means for synchronising operations within a display generator unit. A global synchronisation means may be provided for synchronising operation of a plurality of display generator units. This provides the advantage that different display units, e.g. a set thereof, can all display the same output frame at a same moment in time, so that for an image over a plurality of display units no errors are noticeable.

Encoders may be provided for encoding image data to be displayed so as to generate the input source signals. The encoders comprise coder logic for compressing data related to images to be displayed. The codec logic can be JPEG2000 logic.

Accordingly, the display generator units comprise decoder logic for decompressing data related to images to be displayed. The decoder logic ican be JPEG2000 logic.

Another feature of the present invention is that the display generator units can furthermore comprise means of reading multimedia information for filling it into the data stream of the image to be displayed.

In yet another aspect of the present invention, a display system for displaying streaming image data is provided, comprising display generator units each comprising a processing means and a memory, a shared resource network linking the display generator units, the shared resource network being adapted to receive a plurality of input source signals encoding images to be displayed, a plurality of display units, the display units being for display of at least some of the images encoded in the input source signals, wherein each display generator unit (14) has a means for rendering an image, each means for rendering being adapted for rendering autonomously a dynamically reconfigurable portion of an image to be viewed. The shared resource network can be a local area network or a wide area network. The network may be wired, wireless, optical, etc. as required.

The display generator units may furthermore comprise means for communicating with other display generator units for synchronisation of rendering. This allows that different display units can all display the same output frame at a same moment in time, so that for an image over a plurality of display units no errors are noticeable.

The display generator unit may furthermore comprises local synchronisation means for synchronising operations within a display generator unit. Multiple logical channels may be provided for transferring input source signals encoding images to be displayed to the display generator units.

Preferably, a priority is assigned to the logical channels to distribute power of the DGUs across multiple information sources.

As an additional feature the processing means of the display generator units can comprise a gaming video processor for rendering the images to be displayed. This provides fast rendering of images, e.g. on the fly rendering.

Each display generator unit can be adapted for storing a configuration document, the configuration document including a definition of tasks for all display generator units. The configuration document preferably comprises a full description of the image content for each of the display units. For example, the configuration document is or contains a tagged mark-up language description of the image to be displayed. The document can be a SGML, XML, SVG document for example. This allows swapping between devices in case of fault on one processing device. The new device takes over the role of the faulty device by interrogating the configuration document and has to filter out other information. Accordingly, each display generator unit has a filter to filter out from the configuration document tasks assigned to that display generator unit. Thereby, each DGU capable of defining its active role within the display wall. Preferably, there is a single configuration document for all images to be displayed on the plurality of display units. This is a convenient way to provide redundancy as a display or some of the display units or all display units can take over the job of a display unit, some of the display units or all other display units if so desired. Preferably, a control unit is provided for controlling distribution of the configuration document to the display generator units.

Preferably, each display generator unit is adapted for subscribing to sources (11) of image data to be displayed.

Encoders can be provided for encoding image data to be displayed so as to generate the input source signals. The encoders may comprise coder logic for compressing data related to images to be displayed. The coder logic can be a JPEG2000 logic. Consequently, the display generator units can comprise decoder logic for decompressing data related to images to be displayed. The decoder logic can be JPEG2000 logic.

The display generator units can furthermore comprise means of reading multimedia information for filling it into the data stream of the image to be displayed.

The present invention also provides a display system for displaying streaming image data, comprising display generator units each comprising a processing means and a memory, a shared resource network linking the display generator units, the shared resource network being adapted to receive a plurality of input source signals encoding images to be displayed, the images being encoded by a scalable video codec, a plurality of display units, the display units being for display of at least some of the images encoded in the input source signals, wherein each display generator unit is adapted to selectively subscribe to one or more input sources and to scale the images locally. The shared resource network may be a local area network or a wide area network, for example. The network may be wired, wireless, optical, etc. as required. The scalable video codec can be based on JPEG2000.

Each display generator unit may be adapted for storing a configuration document, the configuration document including a definition of a task of all display generator units. The configuration document may comprise a full description of the image content of each of the display units. The configuration document may be or may contain a tagged mark-up language description of the image to be displayed, such as a SGML, XML, SVG document for instance. This allows swapping between devices is possible in case of fault on one processing device. The new device takes its graphics configuration from the configuration document and has to filter out other information. Accordingly, each display generator unit has a filter to filter out from the configuration document tasks assigned to that display generator unit. Thereby, each DGU is made capable of defining its active role within the display wall. Preferably, there is a single configuration document for all images to be displayed on the plurality of display units. This is a convenient way to provide redundancy, all display units can take over for all others if so desired. A control unit may be provided for controlling distribution of the configuration document to the display generator units. The processing means of the display generator units may be a gaming video processor for rendering the images to be displayed. This allows fast rendering of images and on the fly rendering is possible.

The display generator unit may comprise local synchronisation means for synchronising operations within a display generator unit. Global synchronisation means may be provided for synchronising operation of a plurality of display generator units. This provides the advantage that different display units all display the same output frame at a same moment in time, so that for an image spread over a plurality of display units no errors are noticeable.

Encoders may be provided for encoding image data to be displayed so as to generate the input source signals. The encoders may comprise a video codec for compressing data related to images to be displayed. The display generator units may comprise decoder logic for decompressing data related to images to be displayed. The decoder logic can be based on JPEG2000.

The display generator units may furthermore comprise means of reading multimedia information for filling it into the data stream of the image to be displayed. Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
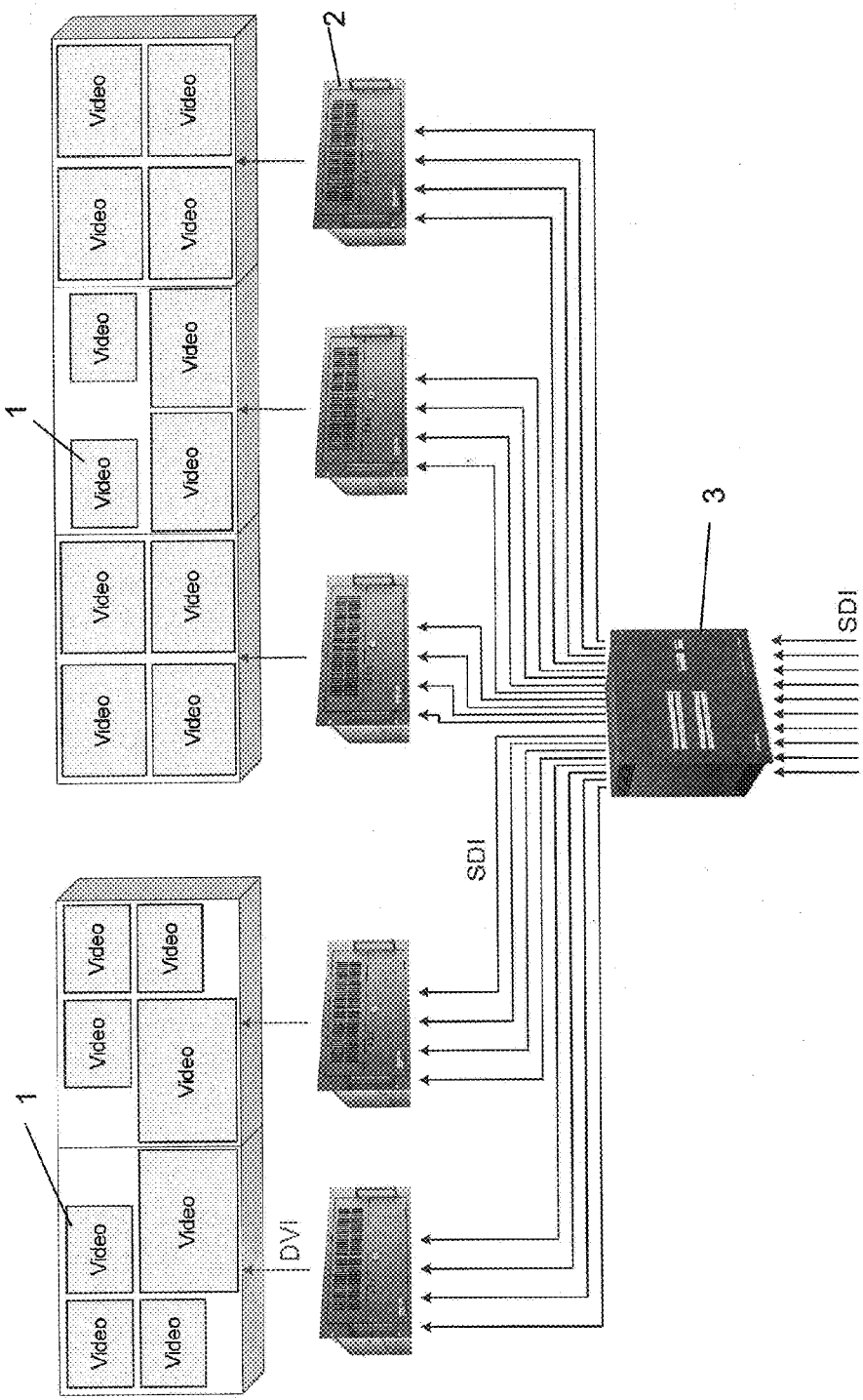
FIG. 1 is an illustration of a classical system architecture for switching and multiplexing of a plurality of input signals to several destinations.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. All references to specific blocks or parts eg. P25, ADV202 etc. . . . are only for illustrative purposes and do not limit the invention to the use of these specific components. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The invention will now be described by a detailed description of several embodiments of the invention. The text is arranged so that in a first part the general arrangement of a system in accordance with the present invention followed by second part giving a more specific description of embodiments of the present invention each of which may be used with any other of the embodiments and may be included in the system as described in any combination. It is clear that other embodiments of the invention can be configured according to the knowledge of persons skilled in the art without departing from the true spirit or technical teaching of the invention, the invention being limited only by the terms of the appended claims.

The present invention provides a design of a digital networked studio and the needed software services to allow the use of the system for monitoring the creation and distribution processes of real-time created content.

A new approach, in accordance with the present invention is to solve the distribution problems using an off-the-shelf network, e.g. using an IP based or similar data protocol, such as an IP network based distributed system architecture to bring the display controller functionality closer to the source and to replace proprietary busses used for transporting video, audio, RGB, graphical information and/or metadata with building blocks based on standard IP and compression technologies. A characteristic of such a network is to use unicast, multicast and/or broadcast technologies (based on network addresses) and to route data from one address to another. This approach requires new network components to provide the necessary services.

Some of the benefits of the replacement of a bus-based system by a distributed network based system architecture are:

The up- and downward scalability of the system.
Systems can become more error resilient by means of redundant networks.
The dependencies on the physical limitations, common to high-speed busses are highly relaxed.
The size, evolution and competition on the IT market drive networking cost down.
The high level of standardization in the IT market ensures interoperability and guarantees the availability of multiple suppliers.
Management of IT networking equipment is 'common knowledge' for IT departments and creates a trust towards the solution being offered.

A distributed system architecture combined with an optional ubiquitous network allows bringing of the system inputs closer to the source. This eliminates the need for analog video/audio/RGB or metadata distribution and guarantees higher quality digital signals—all the way. Still it makes sense to keep the classic distinction between the distribution of the signal and the digital networked studio as:

Multiple display controllers can make use of the same signal distribution.
Multiple distribution systems could be made to cooperate to solve distribution problems.

In an aspect of the present invention an optimal use of a standard network is made to provide sufficient bandwidth based on network-based system architectures. A schematic system of embodiments of the present invention is shown in FIG. 2 and FIG. 3.

Figure 2:
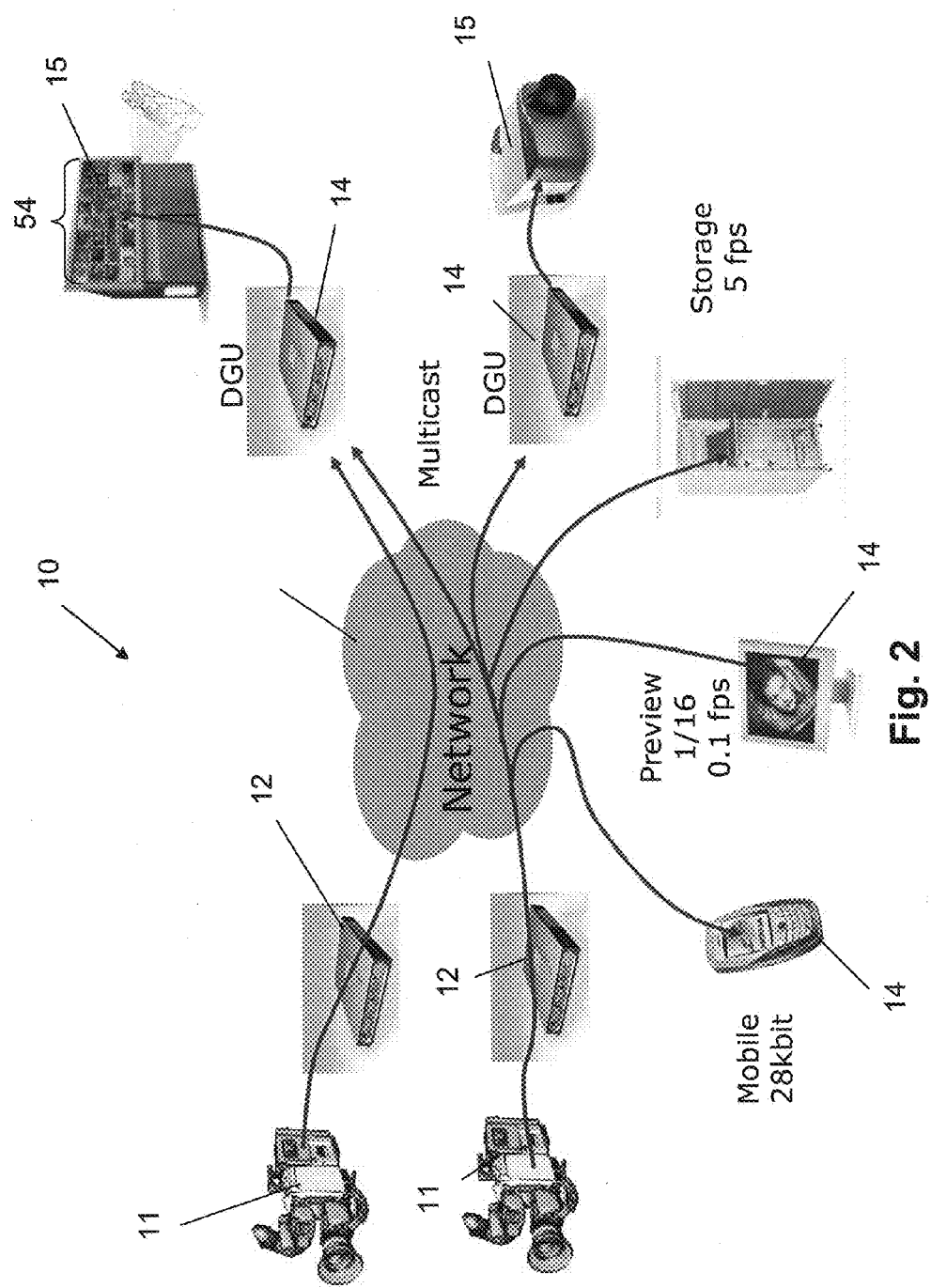
FIG. 2 is an illustration of a network display architecture according to embodiments of the present invention.
Figure 3:
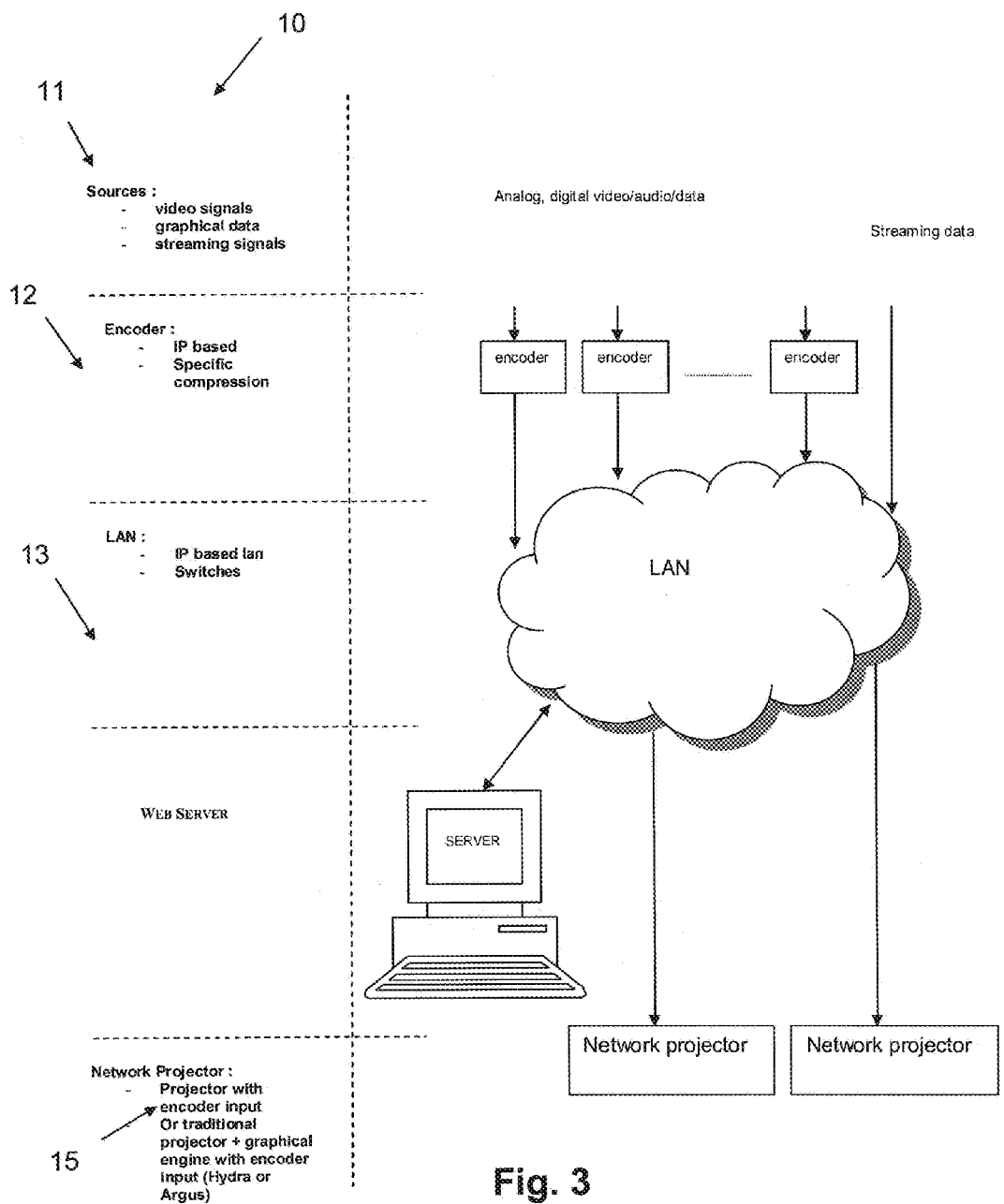
FIG. 3 is an alternative illustration of a network display architecture according to embodiments of the present invention.

FIG. 2 shows a display system 10 comprising a plurality of input sources 11, connected to encoders 12, e.g. source capturing units (SCU) or JP2K encoders. The SCUs 12 are encoders capable of lossless (or optionally lossy) encoding of video into an IP stream. They compress a video stream into a data stream. Encoders, with SCUs being one particular type of embodiment, may create different kinds of data streams, e.g. compressed data streams, such as compressed hierarchical data streams, such as JP2K streams, MPEG2 or MPEG4 streams, MP3 audio streams, metadata streams, embedded information streams etc. . . . . The output signals from the encoders 12 are input signals to a shared resource network 13, e.g. a LAN such as an IP network, from where they are distributed towards display units 15, optionally over display generator units 14.

According to the present invention, the classical system architecture as described with respect to FIG. 1 has been replaced by a network-based architecture, which solves the cabling issue as only the cabling towards the network switch has to be provided to allow the different data streams to travel from encoder to decoder/display. Two embodiments of the present invention will be described hereinafter.

Figure 4:
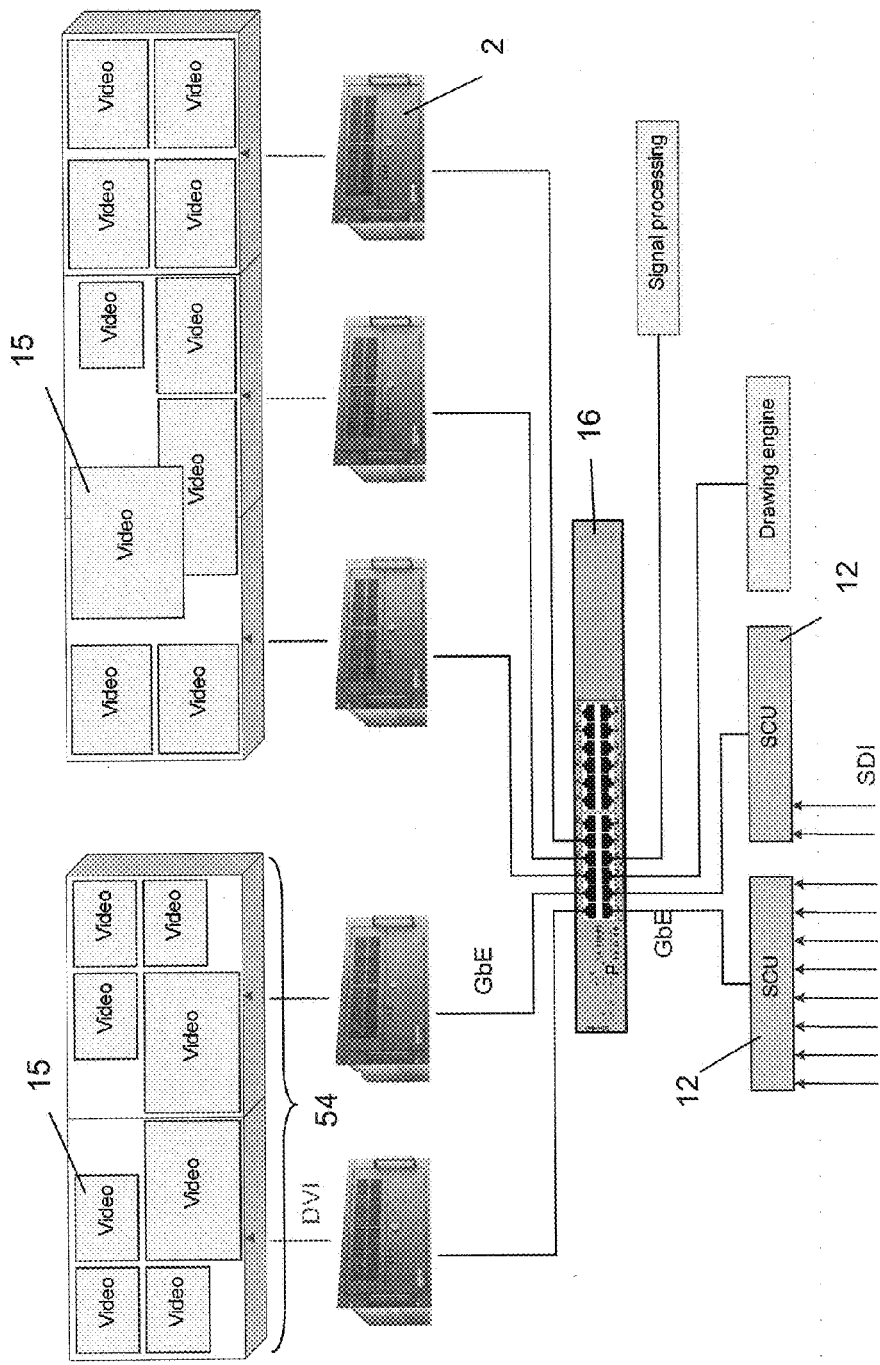
FIG. 4 illustrates a network-based architecture according to a first embodiment of the present invention.

A first embodiment of the present invention is shown schematically in FIG. 4. The first embodiment provides a plurality of encoders 12, e.g. a High Definition/Standard Definition Serial Digital Information Source Capturing Unit (HD/SD SDI SCU) type of encoder and a Hydra Display Generator Unit (Hydra DGU) card for usage with a current display controller 2, e.g. Hydra, hardware platform The drawing engine functional block 82 represents an optionally redundant system generating and distributing a graphics configuration file such as a tagged mark-up language description of the image to be displayed. The signal processing block 83 represents an optionally redundant plurality of systems able to convert different types of information streams (e.g. JP2K to MPEG2 or vice versa or any other combination) or able to extract/derive metadata from an information stream and placing this new information back on the network. Drawing engine and signal processing may be handled by a plurality of servers connected to the network. The encoders 12, e.g. SCUs, can be placed in a managed 19" rack and be hot-swappable. This embodiment uses a switching device 16 such as a network switch for the distribution of the encoded data streams, e.g. a GbE switch (GigabitEthernet switch). In case the switching device 16 is a GbE switch, it is connected to the display controllers 2, e.g. Hydra multi-viewers, by means of GbE cabling. This way, everything is brought down to a modular solution with the help of common network techniques. Any suitable carrier can be used for the network, e.g. wires, glass fibres, wireless connections, etc.

Figure 5:
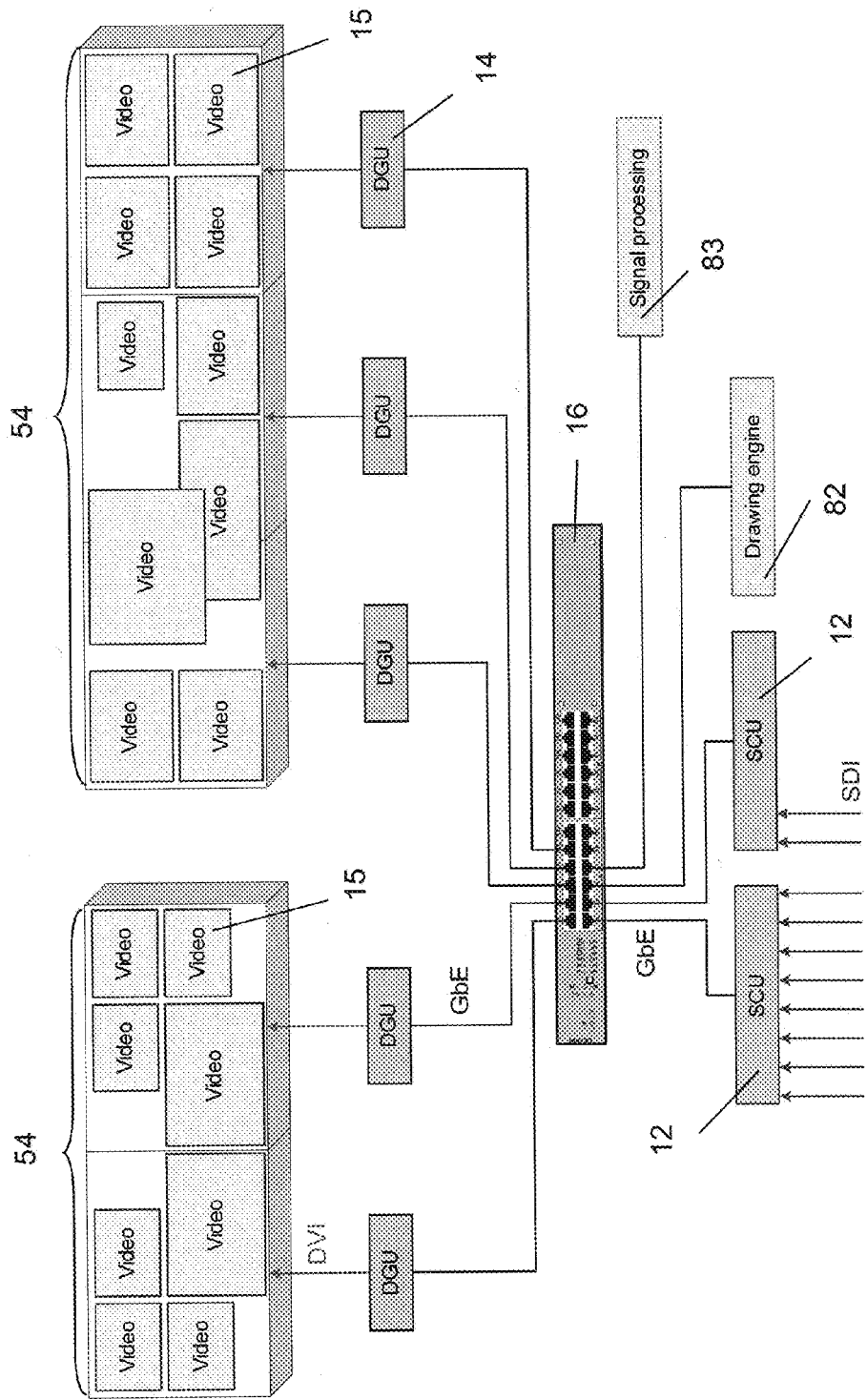
FIG. 5 illustrates a network-based architecture according to a second embodiment of the present invention.

A second embodiment of the present invention is shown in FIG. 5. In the hardware platform of the second embodiment the display controllers, e.g. Hydra units containing Hydra DGUs, are replaced by standalone display generator units (DGU) 14. Drawing engine and signal processing functionality as explained above can be logically separated from the decoder functionality. For example, the DGU card and the single board computer are replaced in the Hydra based solution by a completely new DGU unit 14. In this embodiment, use can be made of a dedicated GPU—graphics processor unit sometimes called a gaming video processor—for example, (inside the DGU 14) to render the images. The transition to a services-based architecture allows the relocation of major pieces of processing from the display controllers 2 to highly powered networked servers, e.g. serving as a drawing engine or signal processing servers. This makes it possible to reduce the new unit to the functionality of an autonomous graphics channel.

Hence, the present invention provides at least one of: an encoder, e.g. SCU, a DGU unit (with a Hydra DGU and a standalone DGU being particular embodiments) a drawing engine and one or more signal processing servers as well as related software—in a non-redundant or redundant configuration.

Parts of the architecture described hereinabove are now explained in more detail hereinbelow.

The Encoders 12. e.g. Source Capturing Unit—SCU

Figure 6:
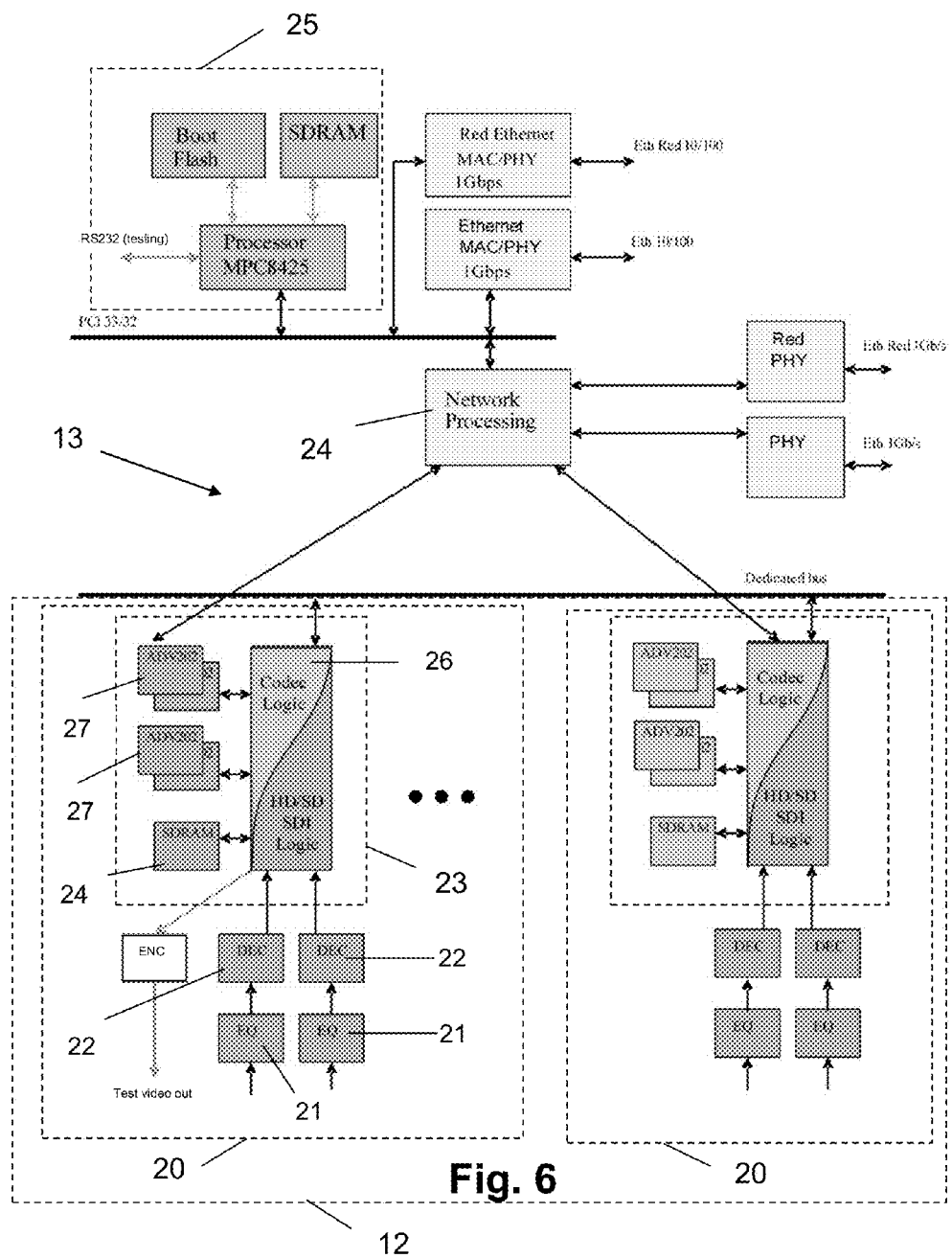
FIG. 6 is a functional diagram of an encoder which can be used with embodiments of the present invention.

FIG. 6 shows a block schematic of the functional blocks of the encoder hardware design in accordance with an embodiment of the present invention. This embodiment is capable of encoding HD/SD SDI signals into any suitable graphics data stream format such as JP2K streams for example, or other compressed formats.

In this diagram the encoder 12 comprises a plurality of multi-input SCU sub-units 20, where each sub-unit 20 has equalising means 21 capable of equalizing (EQ) and decoding means 22 capable of decoding (DEC) a number of incoming SDI signals. A compressor 23 (Codec Logic+ADV202+SDRAM), e.g. for performing JPEG2000 compression, is provided for compressing the equalized and decoded input signals, and for multiplexing the encoded signals prior to unicasting or multicasting them on the network 13 by network processing means 24, e.g. on a redundant 1 GB/s Ethernet network. A processor block 25 (Boot flash+SDRAM+Processor) with a redundant fast Ethernet connection (separation of streaming and control channels) is in control of the multi-input encoder 12.

Since this board can only accept a limited number of streams, no bandwidth-limiting actions must be taken on SCU-side.

Real time encoding at full frame rate is required e.g. during in-sports events phases of operation for broadcast monitoring purposes. Usage of JPEG2000 compression technology or similar codec 26 for compression, a scalable codec, is selected to meet the given requirements in terms of compression, latency, etc. . . . . . In particular the JPEG2000 compression scheme provides particularly useful features. For example, JPEG2000 can provide visually lossless compression while still reaching a reasonable compression ratio. JPEG2000 provides, through the progression mechanism, already a usable form of downscaling. This may avoid the need for the implementation of a downscaler on the display controller inputs. A large number of sources being displayed need not be shown in full resolution. For these images 'lossy' compression is allowed, and JPEG2000 supports such scalability and quality shaping. Influencing compression characteristics allows optimizing the required bandwidth and latency. JPEG2000 supports tiling: sending out the compressed image in tiles brings down the latency as decoding can start as soon as the first tile is being received instead of having to wait for a complete frame. Splitting the encoded image transmission into multiple streams containing different progressions allows minimizing the network load—endpoints not requiring the high-resolution information can subscribe to only the streams with the low-resolution data.

This particular embodiment uses a plurality of decoding devices 27, e.g. ADV202's, for the encoding of multiple channels or to support a lower number of channels at higher resolution. Separation of different JPEG2000 progressions into multiple streams is provided by the network processing block. Tiling can be used to reduce the end-to-end latency. Effective use can be made of the different JPEG2000 frequency levels (e.g. wavelet scaling) to reduce the required bandwidth towards the DGU's 14. A DGU 14 will only receive data up to the scale factor it needs.

Display Generator Unit—DGU—of the First Embodiment: Hydra DGU Mezzanine

Figure 7:
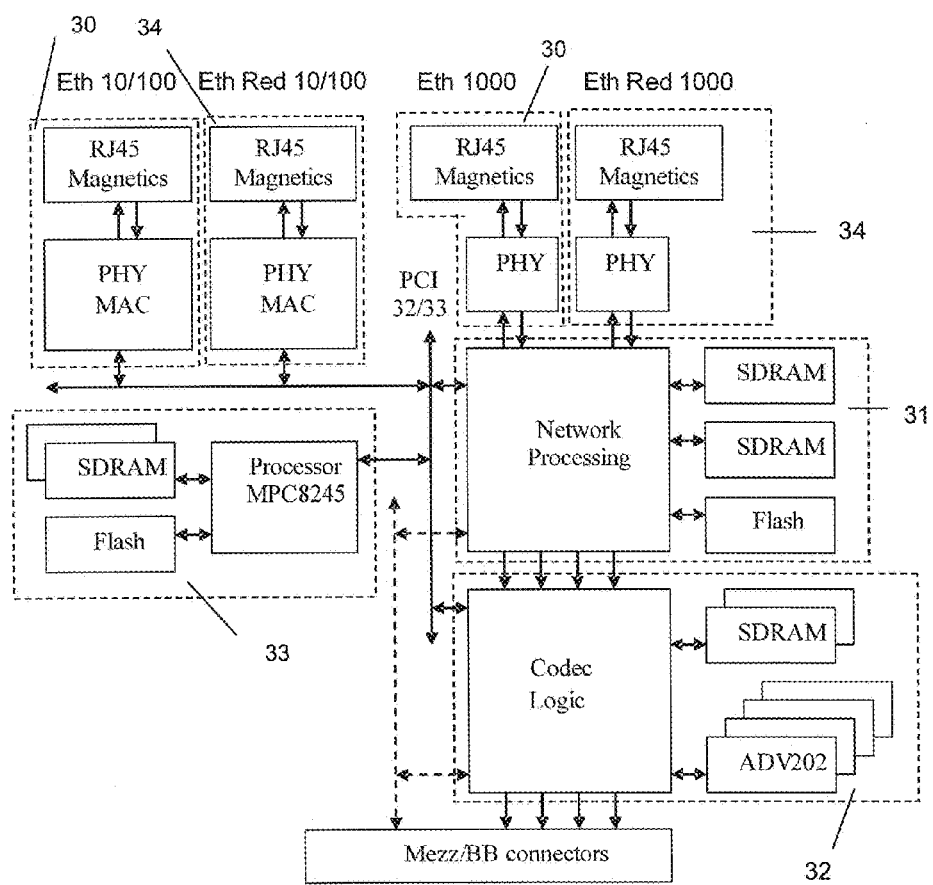
FIG. 7 is a functional diagram of the decoder part of a Hydra display generator unit for use with a network-based architecture according to the first embodiment of the present invention.

The DGU in accordance with the first embodiment of the present invention as described above is shown in FIG. 7. The block schematic shown describes the different functional parts provided in the DGU mezzanine.

The DGU unit receives a number of encoded signals—unicasted or multicasted on the network 13—through the redundant 1 Gb/s network interface in a number of input buffers 30 (RJ45 Magnetics—PHY). The buffered signals are processed in a processor 31 (Network processing—SDRAM—Flash). The received signals are then decoded in a decoder 32 (Codec logic—SDRAM—ADV202) and transferred across the baseboard-mezzanine interface of the multi-viewer driver 2, e.g. Hydra, to the baseboard of the multi-viewer driver 2, e.g. Hydra. This baseboard takes care of inserting the decoded image on the internal bus of the multi-viewer driver 2, e.g. Hydra. A controller block 33 (SDRAM+flash+processor) with an own redundant fast Ethernet network interface 33—to separate streaming and control channels—(RJ45-Mac Phy) is used to control the display generator unit 14. The Hydra Single Board Computer (SBC) is used to render metadata and embedded information.

Display Generator Unit—DGU—of the Second Embodiment: Standalone DGU Unit 14

Figure 8:
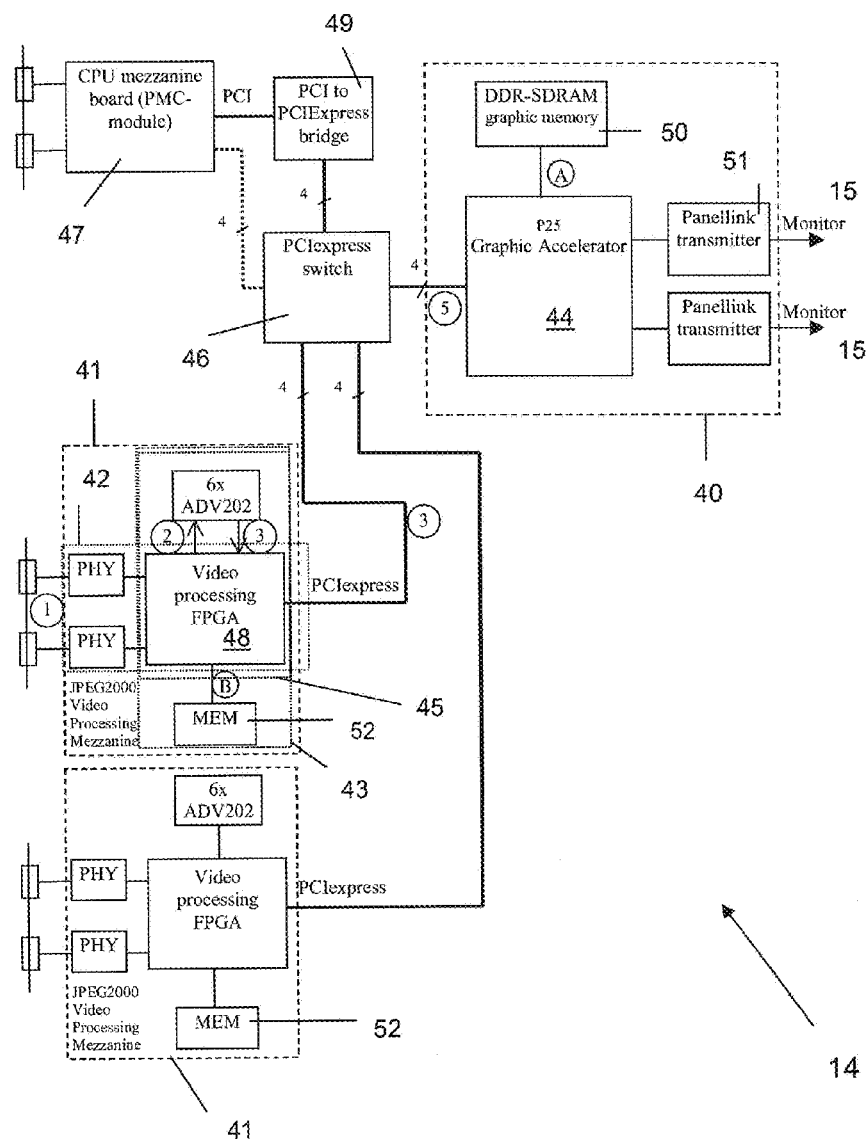
FIG. 8 is a block diagram of a display generator unit for use with the second embodiments of the present invention.

A particular embodiment of a standalone DGU unit 14 of the second embodiment is shown schematically in FIG. 8. The standalone DGU 14 has a design which is different from the DGU mezzanine as described above.

Because of the fact that the DGU 14 has to take over the rendering capability of the multi-viewer driver 2, e.g. Hydra single board computer, the DGU 14 can be equipped with a drawing unit 40 existing of a GPU—graphical processor unit/graphical accelerator+DDR SRAM+panellink transmitter). Multiple decoding units 41 can be hooked up to a single DGU 14 enhancing or increasing the number of signals that can be decoded and shown. The encoded signals are received across an Ethernet input block 42 (Network processing+PHY) and decoded by a decoder block 43 which might contain different types of decoding devices or decoders (e.g. ADV202 for JPEG2000, an MPEG2/4 decoding DSP . . . ). The decoded signals are subsequently rendered by the GPU 44 of the drawing unit 40.

Since this board can accept a high number of coded input streams, bandwidth-limiting actions may be required on the side of the encoder 12, e.g. on SCU-side, to minimize the network-load on the DGU 14 or the network interface on the DGU side may be designed to have a higher bandwidth than the SCU. For example the load may be divided over one or more pairs of Gigabit network interfaces in accordance with an aspect of the present invention.

The following functional blocks can be used in this DGU 14: the drawing unit 40, the decoding units 41 and the CPU unit 47. These building blocks are connected together via a switching means 46, e.g. via a PClexpress switch. The decoding units 41 execute the same function as in the first embodiment. The single board computer (SBC) of the Hydra in the first embodiment is replaced by the drawing unit 40 and CPU unit 47 in the second embodiment. This separation allows to provide better performance on both the CPU and drawing functionality. The CPU unit 47 is in control of the setup and operation of the DGU unit and can receive commands across a separated control network (out-of-band control) or across the video network (in-band control). The decoding unit 41 receives the encoded information across the gigabit interface, decodes the information and forwards it to the drawing unit 40. The drawing unit 40 renders the information requested in the graphics configuration file, e.g. tagged mark-up language configuration document 61.

The Video Processing unit, e.g. FPGA, 48 is responsible for the reception of the encoded information from the network as well as the decoding and forwarding of the information to the graphic accelerator 44 of the drawing unit 40. To ensure enough video processing capability for 2 times UXGA graphic resolution and to support overlapping video windows, the Video Processing unit, e.g. FPGA, —together with its appropriate compression, e.g. JPEG2000, decoders—is available multiple times.

The CPU unit 47 may run an off-the-shelf operating system such as e.g. Windows or Linux and exploit graphics capabilities using technologies such as DirectDraw, Direct3D, X11 and OpenGL to draw graphics. The graphics capabilities may also be used to scale the videos and to mix the videos with the rendered information.

The network processing block 48 in the CPU mezzanine board 47 provides a network interface with a high sustained bandwidth—approximating 1 Gb/sec, and may be implemented as an embedded processor, network processor or FPGA, etc. Preferably, the use of the protocol stack of the operating system from CPU unit block allows the design of a kernel mode device driver allowing transparent use of this network interface This block 48 may also provide bonding (automatic switching between active and redundant Ethernet ports) or load balancing (dividing the total required network load over the 2 (or more) Gigabit Ethernet interfaces. Preferably, buffering should be kept as low as possible to minimize latency. The actual design of the network processing block 48 can be reused in both SCU encoder and DGU mezzanine (with opposite directions send/receive).

PCI-X to PCI-express bridge 49 and PCI-express switch 46.

Drawing unit 40. The drawing unit 40 comprises a graphic accelerator 44, and may comprise a memory element 50 such as a DDR SRAM and one or more panellink, DVI or SDVO transmitters 51 for transmitting data signals to the display units 15. The drawing unit or graphical accelerator unit 40 can optionally display and process multiple decompressed video streams using its 2D or rendering mechanisms. The graphical accelerators 44 may provide genlock or framelock functionality—allowing to synchronize drawing between multiple DGUs. If this is not the case the drawing unit 40 can be adapted to provide this higher level function instead of the graphical accelerator 44. According to an embodiment of the present invention, the graphic accelerator 44 may be a general purpose GPU (Graphical Processor Unit), or a custom solution providing comparable functionality.

Video is blown into such 2D/3D processor, also called a gaming processor, and will be converted and mixed with the other information described as part of the tagged mark-up language configuration document, e.g. on the fly. Therefore, according to an embodiment of the present invention, a multi-viewer is obtained by using a gaming processor.

Gaming processors typically use hardware acceleration to provide high rendering speed and to offload the CPU unit. Hardware acceleration may be done in 2D or 3D environments. In 3D environments images or scenes are created using polygonals such as triangles, and a texture may be positioned onto every single polygonal, e.g. triangle. The drawing unit must be fast enough to make a composition of the information described as part of graphics configuration file, e.g. the tagged mark-up language configuration document and the decoded streamed information.

Decoding unit 41. The decoding unit 41 comprises a Video Processing unit or decoder block 43 (comprising a compression decoder 45, e.g. a JPEG2000 decoder), as illustrated in more detail in FIG. 9. This can be based e.g. on streaming video and JPEG2000 codec designs. Up to two Video Processing Mezzanine Boards 41 can be connected to the base board in this particular embodiment of the present invention. These decoding units receive the video streams from the network, decode them and transfer the videos to the graphic accelerator 44 of the graphical accelerator unit 40. Different compression standards can be supported with different Mezzanine boards 41. The first available board may support JPEG2000 video streams.

Figure 9:
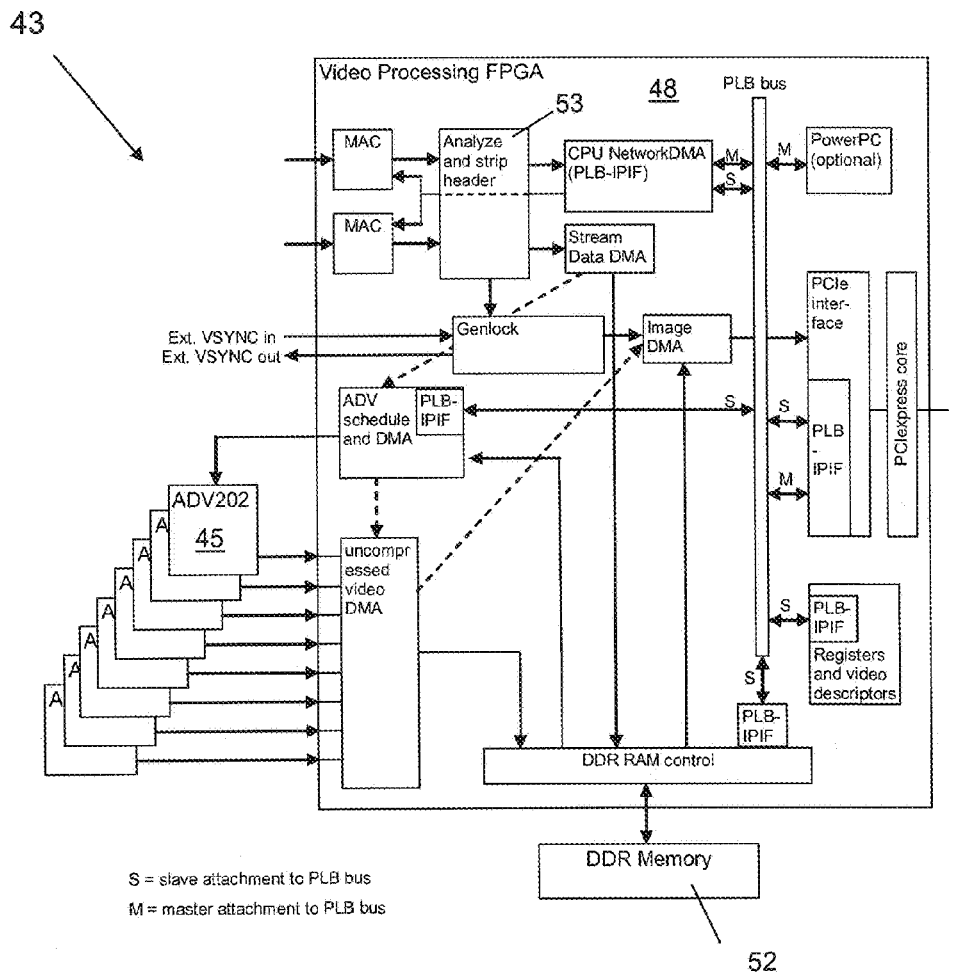
FIG. 9 is a more detailed schematic representation of a decoder block of a display generator unit.

The decoder block 43, see also FIG. 9, comprises a Video Processing FPGA 48. The Video Processing FPGA 48 receives the compressed video streams over a network interface, e.g. one of two network interfaces. The video streams are processed according to descriptors that are programmed by the CPU unit which is under the control of the DGU. This processing comprises at least one and preferably all of the following steps for this particular embodiment using, for example, JP2K compression:

receiving the compressed video data from the network, thereby filtering to the selected multicast addresses if multicasting is used, removing of the network headers in a stripping means 53, assigning an internal tile number as reference for the further processing, storing the data in a memory element 52, e.g. DDR-RAM, until all data of one tile is received, reading the data of a tile out of the memory element 52 and transfer it in one of the compression decoders 45, e.g. ADV202, where it is decompressed, reading the uncompressed video data out of the compression decoders 45 and store it in the memory element 52, e.g. DDR-RAM, combine color components that are belonging to one tile and transfer the tile either as 32 bit RGB or as 16YUV to the graphic accelerator 44 of the graphical accelerator unit 40, combine tiles belonging to one video into one texture, add commands to the graphic accelerator's command queue to process the video textures synchronous to the output frame rate.

Besides the above, the video processing unit, e.g. FPGA 48 has to generate a Master-VSYNC signal out of the genlock packet received from the network. This Master-VSYNC can be used by the graphical accelerator unit 40 to lock to the video frame rate. The video processor functional block 48 can be designed to be reused in the encoder 12, Hydra DGU card and final DGU unit.

Alternatively it can be adapted to handle only the communication protocols (ARP, PING, IGMP, . . . ) when a gate array is chosen, e.g. an FPGA-based system. Any suitable operating system can be used, e.g. a Linux, Windows, QMS or real time operating system. A driver is provided to handle the high-speed network interface.

To enable the CPU unit 47 to access the network also through the network interfaces of the Video Processing unit, e.g.

FPGA, 48 a separate DMA controller (not illustrated) for the CPU unit 47 may be provided. This interface can be used by the CPU unit 47 to make only administration work for these interfaces (e.g. subscribe to multicast addresses for the video streams). To enable the CPU unit 47 to use this network interface also for normal operation (IP connections), this interface has to be on a different subnet as the other interfaces on the DGU 14.

The decoder unit 43 comprises compression decoding devices 45. The compression decoding devices 45 have to decode the compressed video and data streams, e.g. JPEG2000 streams. Dependant on the type of compression algorithm used and how the decoded information needs to be displayed it may be required to use multiple compression decoding devices 45.

Each compression decoding device 45 may work independently of the other compression decoding devices 45 or decoding devices may combine their compression capabilities. The combining of color components and tiles are done in the video processing FPGA 48 and the graphic accelerator unit 40.

The streams coming from the encoders 12, e.g. SCUs, preferably have to following properties in this embodiment:
  Each tile is a separate coded stream, e.g. a JPEG2000 stream
  For RGB data, each color component is a separate coded stream, e.g. a JPEG2000 stream, i.e. one stream per tile and color component
  YUV data can be one combined stream for the color components, i.e. one stream per tile, or can be divided into a Y and a UV stream, i.e. two streams per tile
  Resolution levels that will be sent to different multicast addresses build together one stream. If not all resolution levels are needed to build a down-scaled picture, the Video Processing FPGA 48 modifies the stream header accordingly (e.g. with an ADV202 compressed header and End of codestream marker).
  Frame numbers are assigned to the streams by the encoders 12. Each coded stream, e.g. JPEG2000 stream, that belongs to the same video frame has the same frame number. For example the frame number in the ADV202 header can be used for that.

The DGU 14 generates the output for one, two or more display units 15, e.g. monitors or projectors. It is aware of the X-Y-position of the display units 15 within a physical display wall 54 for which it generates the output and performs the necessary clipping to render the graphics information received.

Figure 10:
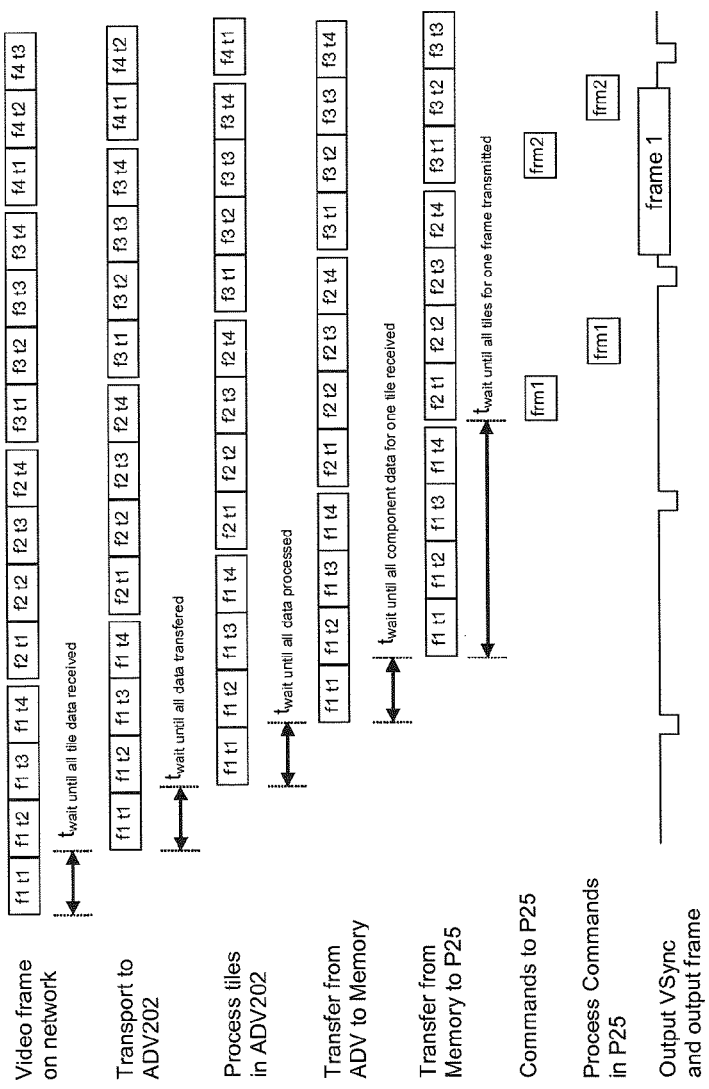
FIG. 10 is an illustration of possible frame delay introduced by internal processing inside a display generator unit in an embodiment of the present invention.

The DGU 14, with the above-mentioned functional blocks, has the following tasks:
  Receive all video source tiles from the network 13 that should be displayed on its two or more display units 15.
  Decode the compressed video tiles (e.g. JPEG2000) in the decoder block 43.
  Combine the video tiles belonging to one video source to one texture.
  Upscale the video textures with the 3D capabilities of the graphic accelerator.
  Receive the graphical commands from the network 13 for those desktops and graphic elements that should be displayed.
  Clip the graphical commands to these parts that should be displayed by these two or more graphic channels of the display units 15.
  Draw the graphical commands in the local graphic memory.
  Upscale the desktops.
  Draw background picture for those display parts that are not covered by a desktop or a video.
  Mix desktops background and video sources based on clip lists and alpha blending
  Generate Monitor timing
  Genlock—for combining computer graphics with video The DGU 14 should introduce as little delay, e.g. frame delays, as possible into the video streams between the video being present on the network 13 and the videos getting visible on the display unit 15, e.g. monitor or projector. FIG. 10 illustrates frame delay introduced by DGU internal processing. FIG. 10 shows that the estimated frame delay for an embodiment is approximately 3 frames (progressive scan). But this mainly depends on the size of the tiles. Smaller tiles introduce less delay.

The DGU 14 may be integrated into a display device according to an embodiment of the present invention.

In accordance with the present invention, streams are broken down at the streaming server side, so multiple streams each having different kinds of information are obtained. Even the compressed video stream can be transmitted in different parts each containing a subset of the information. Clients may have to subscribe to multiple streams to receive the information required for decoding. The reason for this 'added complexity' is scalability. If all information would be combined, the needed bandwidth would be very high. This would make it impossible for a standard PC to receive multiple streams. In case of the present invention, only the parts of the information needed are received.

Coupling this with the size of the video windows (in discrete steps) makes it possible to state that we can show unlimited sources as we can now provide decoding capacity to fill as many pixels as the displays provide. If large windows are used, more info will be taken for that source from the network. If multiple smaller windows are used, smaller pieced are taken for each source from the network.

As said, each source can provide multiple separated streams providing embedded or metadata information. Clients need to ask the server sourcing the stream to provide them with the wanted information otherwise the information is pruned to reserve bandwidth.

Information can be streamed on the network using point to point connections or using multicast connections. Multicast connections are limited resources. This means the assignment of multicast addresses has to be managed in a dynamic way to make sure that no traffic bottlenecks exist (as x unicasts require x times the bandwidth of a single multicast stream) within the network.

Decoding a source and switching to another source has to happen substantially instantaneously. This means that both the previous source and the new source to be displayed have to be decoded at the same time—requiring the information from both sources to be transferred during the transition period. To prevent exceeding available bandwidth the subscription to multiple parts of a video stream has to be handled dynamically.

Data and Command Flow According to Embodiments of the Invention

Figure 11:
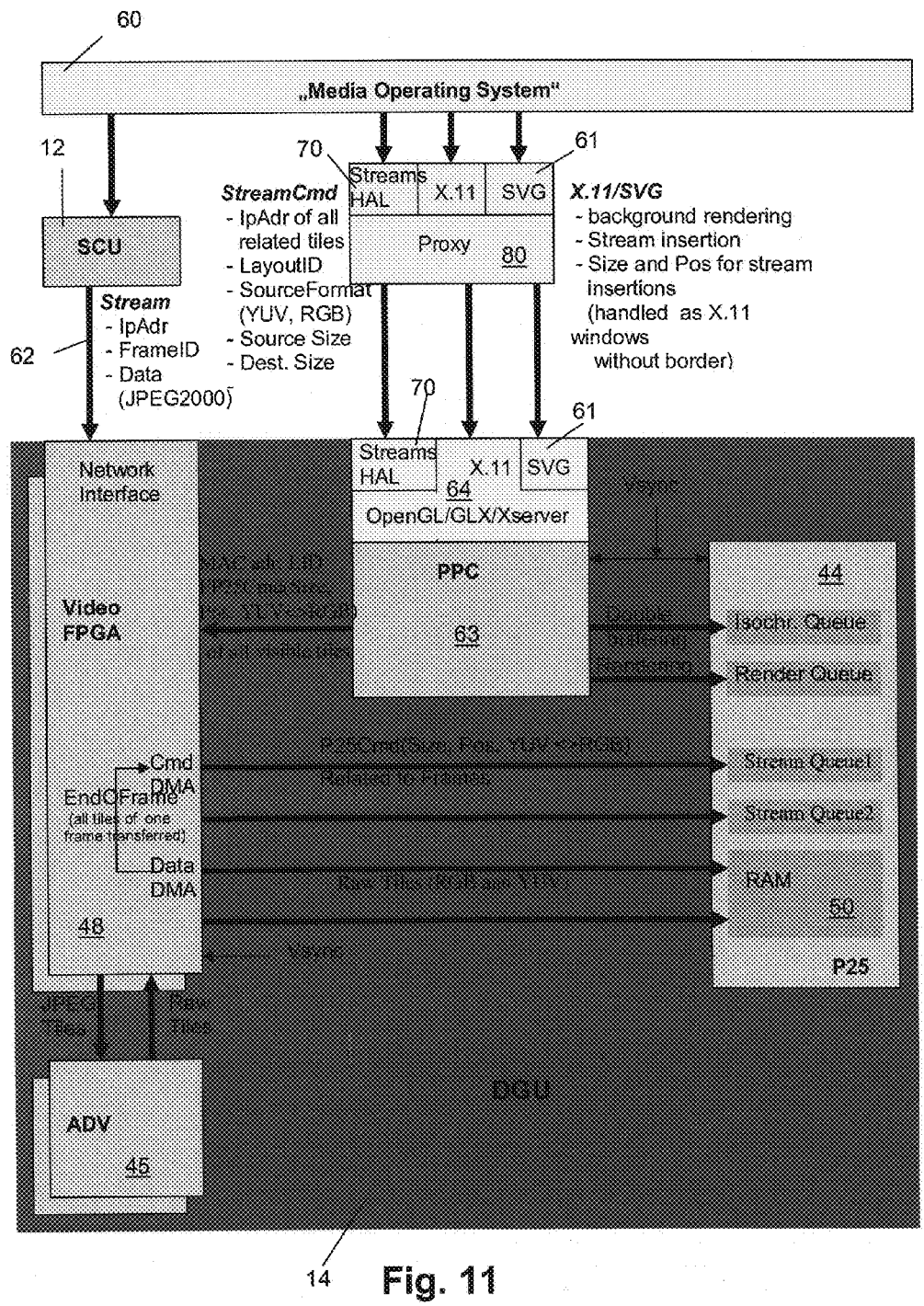
FIG. 11 gives an overview of data and command flow in accordance with a possible embodiment of the present invention.

The data and command flow of a system according to the present invention are illustrated by means of FIG. 11.

A control unit 60, also called "Media Operating System", sends a graphics, configuration file, e.g. a tagged mark-up language configuration document 61, e.g. an XML document or an SVG document, to the DGUs 14. This configuration document 61 includes a definition of a task of each of the DGUs 14, and is stored in the DGUs 14.

Encoded streams 62 or SCU streams, i.e. image data streams encoded in the encoders 12, e.g. JPEG2000 encoded, source data to several multicast IP addresses on the shared resource network 13 (not illustrated in FIG. 11). The IP addresses or multicast groups are regarded as the unique identification of a certain source, which is processed within a DGU 14. The "Media Operating System" 60, via the configuration document 61, tells the DGU 14 to which IP addresses it has to subscribe and how the dedicated source has to be processed in terms of scaling, color space conversion and positioning.

The network interface of the DGU 14 for receiving the, e.g., JPEG2000 encoded SCU streams 62 is preferably implemented in hardware to guarantee maximum throughput with minimum processor intervention. The streams to be received are defined by a dedicated MAC addresses. The hardware receives this MAC address from a conversion block 63 (PPC), which does the conversion from IP addresses to MAC addresses.

Packet reordering up to certain level is supported by using Data Address Offset (DAO) within the packet header, which may be a proprietary header introduced to ease DGU design. This header will be added by the encoder 12 (SCU) to each network packet. The DAO in this header specifies the byte address offset for data sent within this packet relative to the start of the tile.

Identification of incoming streams is done completely by IP addressing. Each tile of an input source is identified by its multicast IP address. The control unit 60 (Media Operating System) has all information available, which tiles a DGU 14 has to receive in order to visualize the desired part of a source. Identification of incoming frames is done by means of an input frame counter embedded in the packet header—this is used to determine which packets belong to which input frame.

Positioning of insertion rectangles on the screen is part of the operating system 64, e.g. Xwindows, running on the DGU 14. X.11 windows (without borders) may for example be used, which insertions are mapped to. So, standard X.11 methods can be available to achieve positioning. The relation between an input stream and an X.11 window is defined via Streams HAL. This hardware access layer (HAL) is an API (application programming interface) providing access to the Hydra hardware.

The DGU 14 is capable of performing both up- and down-scaling by using the texture engine of the graphic accelerator 44 (e.g. a P25). The control unit 60 (Media Operating System) tells the DGU 14, by means of the configuration document 61, which scaling operation has to be done on the dedicated input stream. Therefore it defines source size and destination size for each stream of tiles which has to be processed within the DGU 14. The destination size is in fact the size of the X.11 window, which defines the streams area on the screen of the display unit 15. So, standard X.11 methods can be used to feed this information to the DGU 14. The relation between and input stream and an X.11 window is defined via Streams HAL.

The output color format on the DGU 14 is typically RGB. The DGU 14 is capable of converting any input stream from a first color format, e.g. YUV 4:2:2, to a color format to be displayed, e.g. RGB. This is done within the texture engine of the graphic accelerator 44 (e.g. a P25). The control unit 60 (Media Operating System) tells the DGU 14, via the configuration document, which color format the incoming stream has. Based on this, DGU 14 performs color space conversion to the color format to be displayed, if necessary.

Figure 12:
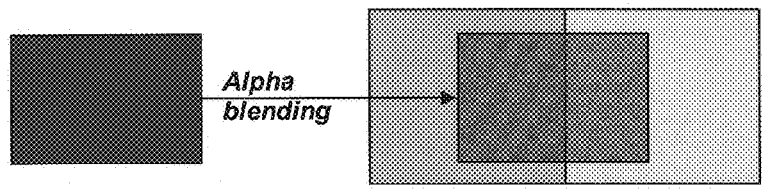
FIG. 12 illustrates alpha blending

For overlapping images, alpha blending can be defined for each source in 256 color levels. When set to 0, the foreground is completely transparent. When it is set to 1, it becomes opaque and totally obscures the background. Any intermediate value creates a mixture of the two images, as illustrated in FIG. 12.

For non-rectangular display areas one can have non-rectangular cropping or non-rectangular mapping. In non-rectangular cropping, a source image can be cropped in a way that any non-rectangular part of it is visible on the screen. Via Streams HAL any client may specify a pixel oriented on/off bitmap (output coordinates) for each source, which specifies the visible part on the image. Amongst others this allows to visualize control and monitoring elements within a source (e.g. audio metering) in an effective way. In non-rectangular mapping a source image is mapped to a non-rectangular area both 2-dimensional (e.g. rhombus) and 3-dimensional (e.g. sphere). This is possible by using 3D capabilities of the graphic accelerator 44 (e.g. a P25).

Figure 13:
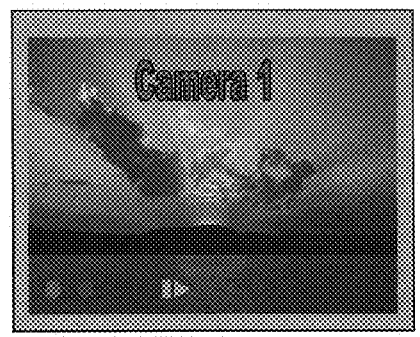
FIG. 13 illustrates overlay or underlay of information as used in embodiments of the present invention.

Using 2D or 3D graphics accelerator 44 capabilities it is possible to underlay or overlay graphics and decoded compressed information with respect to one another—see FIG. 13. This allows e.g. for efficient ways to mark up decoded compressed information.

Synchronisation of DGUs

Figure 14:
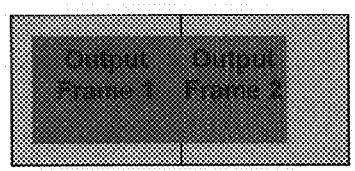
FIG. 14 illustrates display of non-frame-locked DGU images.

As long as no further action is taken, the DGU 14 will run in free-running mode, which means the output timing is generated internally and not locked to another device, neither encoder 12 (SCU) nor DGU 14. This means that different DGUs 14 driving display units 15 forming one display wall 54 are not synchronized, so they will not necessarily display the same frame at the same moment in time. As a consequence a user may see 2 different parts of one picture, if a stream has to be shown on more than one screen, as illustrated in FIG. 14.

Figure 15:
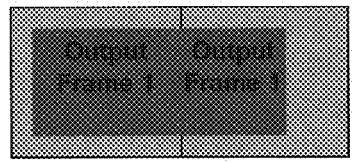
FIG. 15 illustrates display of frame-locked DGU images.

This effect can be avoided by running DGUs 14 in frame-lock mode, which means their output timing is locked to the output timing of another DGU 14. The result is that at any moment in time, for the frame-locked DGUs 14, a user always sees the two corresponding parts of one picture, as illustrated in FIG. 15.

There are 2 possibilities to achieve this: HW based frame-lock and network based frame-lock.

In HW based frame-lock there is an input connector available on the DGU 14, which accepts an external VSync or blackburst signal. If enabled via Streams HAL, the DGU 14 locks its vertical retrace signal to this input. Furthermore the DGU 14 can deliver its Vsync via a connector to the external world. So, via cabling one DGU 14, which is programmed to free running mode, the Vsync can be provided to all other DGUs 14, which are programmed to use the external Vsync input as reference.

In network based frame-lock, frame-lock is possible, without having a dedicated cable connection between DGUs 14, based on synchronization packets sent by one of the DGUs 14, which are then reconstructed within another DGU 14 to a vertical retrace signal. This network based frame-lock mode can be established using time synchronisation standards such as, for example, IEEE 1588 or using proprietary solutions such as described below:

Define one DGU 14 as sync master this DGU 14 sends synchronization packets

Program all other DGUs 14 to receive the synchronization packets.

Program the master sync DGU 14 to send a synchronization packet including valid frame counter value in order to synchronize output frame counters of all DGUs 14.

A DGU 14 can subscribe to a dedicated multicast address, which is considered to be the connection to receive synchronization packets. These packets are used to reconstruct internally a Vsync signal, which can be used as vertical retrace. Synchronization of DGU operations within the DGU 14 is done based on the vertical retrace signal (Vysnc), which allows operations to occur always frame synchronized. Furthermore the synchronization packet contains a start value for the output frame counter, which is loaded, if DGU 14 is told to do so by means of the configuration document 61.

Figure 16:
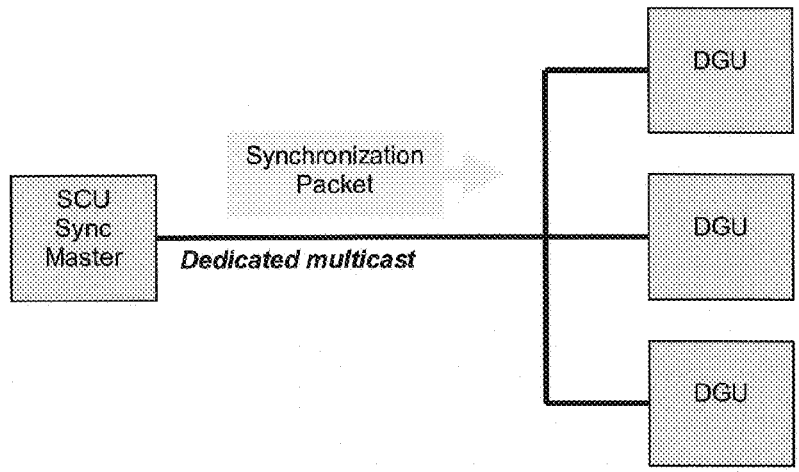
FIG. 16 shows an encoder which is a synchronisation master which sends a synchronisation packet to a plurality of display generator units.

The synchronization packet is sent by the synchronization master within the system. This can be either an encoder 12 (SCU) (genlock), as illustrated in FIG. 16, or a DGU 14 (framelock). The control unit 60 (Media Operating System) determines which device is synchronisation master, and tells this to the system by means of the configuration document 60. So, both encoder 12 (SCU) and DGU 14 are able to send the synchronization packet to a dedicated multicast address. When sending synchronisation packets jitter has to be minimized, because the send-frequency of this packet reflects the vertical refresh rate of the source.

Figure 17:
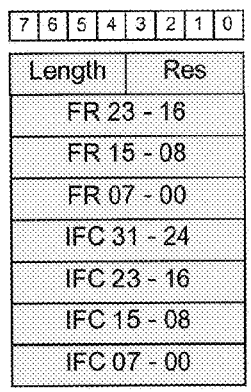
FIG. 17 illustrates a data format of an embodiment of an UDP synchronization packet.

The synchronization packet may be a standard UDP packet, which e.g. contains 64 bit data. A possible data format thereof is illustrated in FIG. 17.

Figure 18:
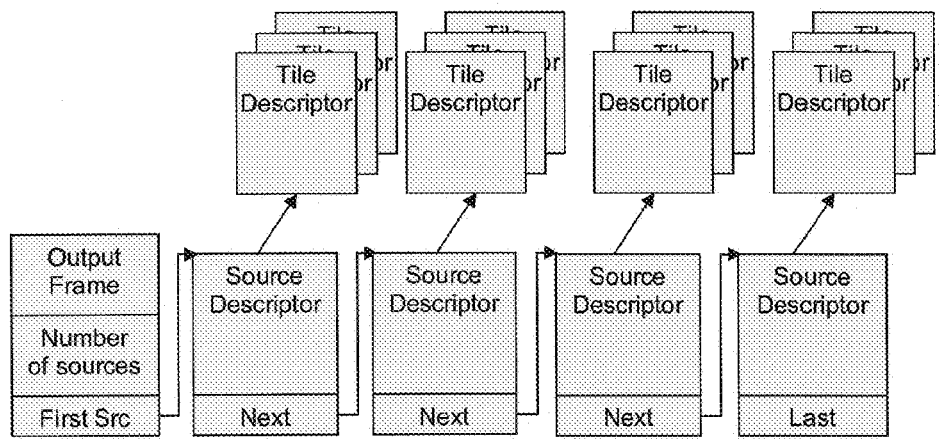
FIG. 18 illustrates synchronisation of frames from different sources to one output frame.

All source tiles of one frame are logically tied together by a common Input Frame Counter, which is available within the proprietary packet header. Several frames of different sources can be synchronized to one output frame by defining a layout switch to be done at one output frame. The control unit 60 (Media Operating System) may define all tiles to be switched at the same moment by passing a linked list of source/tile descriptors as illustrated in FIG. 18 to DGU 14, headed by a descriptor defining the output frame, at which the layout switch should occur.

The DGU 14 provides a 32-bit output frame counter, which is incremented on each vertical retrace. It can be set and read by the control unit 60 (Media Operating System) via "Streams HAL". Also the frame counter may be set automatically to the value defined within a synchronization packet.

The output frame counter is used for both frame-lock and genlock to make sure that all DGUs 14 display the same output frame at the same moment in time. Also it can be used to perform time based layout switch.

Genlock is supported by locking the vertical retrace of DGU 14 to the vertical sync of one video source (SCU) 12 or to a studio clock (blackburst).

Time Based Layout Switch

When describing a layout switch operation via Streams HAL it is possible to define at which output frame the new arrangement of streams should appear. Knowing both actual output frame and vertical refresh frequency the control unit 60 (Media Operating System) can send stream related commands to the DGUs 14 in advance by means of a configuration document 61, and their result will appear at a defined moment in time.

Software Architecture

Figure 19:
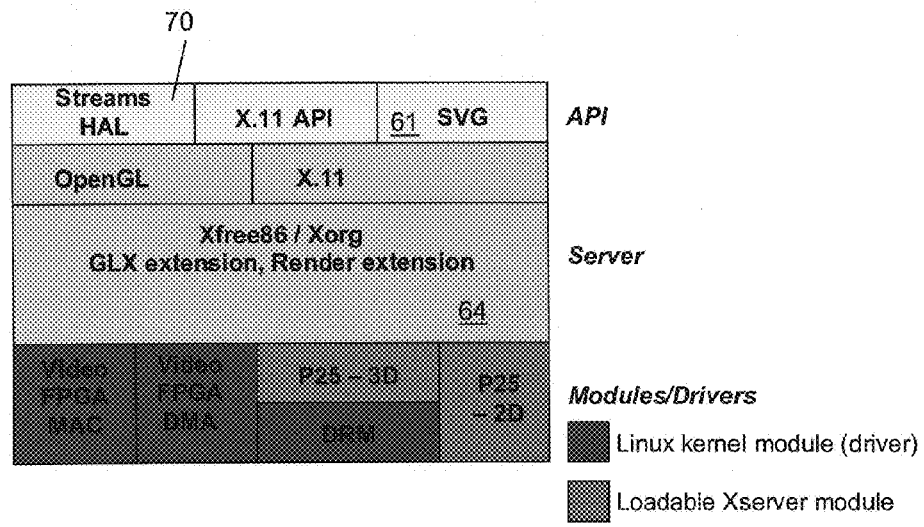
FIG. 19 illustrates a software architecture in accordance with embodiments of the present invention.

A software layering on the Hydra DGU or standalone DGU according to embodiments of the present invention is illustrated in more detail in FIG. 19. A multi protocol server 64 (different socket connections per protocol) e.g. based on X.11 is running on DGU 14 to allow to applications like the control unit 60 (Media Operating System) access to streams processing and rendering capabilities. Besides standard X.11 protocol (including standard X-extensions) this server 64 offers a configuration document interface, e.g. an SVG interface, as well as an API to control stream related functionality (Streams HAL).

Streams Hardware Abstraction Layer

The hardware abstraction layer 70 (HAL) for streams commands is in fact the API provided by DGU 14 to allow external clients like the control unit 60 (Media Operating System) to control subscription and processing of streams delivered by encoders 12 (SCU) via the network 13. Streams related commands, which have to be processed by the graphic accelerator 44 (P25) are translated to either 2D or 3D (e.g. Direct3D, OpenGL) calls.

Each stream inserted to DGU 14 is displayed within a window, e.g. an X.11 window (without borders), which offers a display area for the incoming live stream (source). There is a one-to-one relation between a window and a source. The window is filled completely with the dedicated source. This allows usage of standard, e.g. X.11, methods to control positioning and scaling of streams, which is equal to modify position and size of the window.

As described above, streams related functions have to be synchronized to the output frame number. Using e.g. the standard X.11 API this would not be possible. This means, X.11 calls to configure the X.11 window, which is used to display a source, cannot be done directly by the control unit 60 (Media Operating System). In fact the X.11 call to configure the window will be done by Streams HAL 70 as soon as the control unit 60 (Media Operating System) asks Streams HAL 70 to provide a new configuration (position, scaling, stacking order) of a source to be displayed on the screen.

From the logical point of view Streams HAL 70 has to provide additional functionality, which is described below. This list should not be regarded as a description how the API is implemented but merely provides a view on possible additional functionality of the API to be provided.

Figure 20:
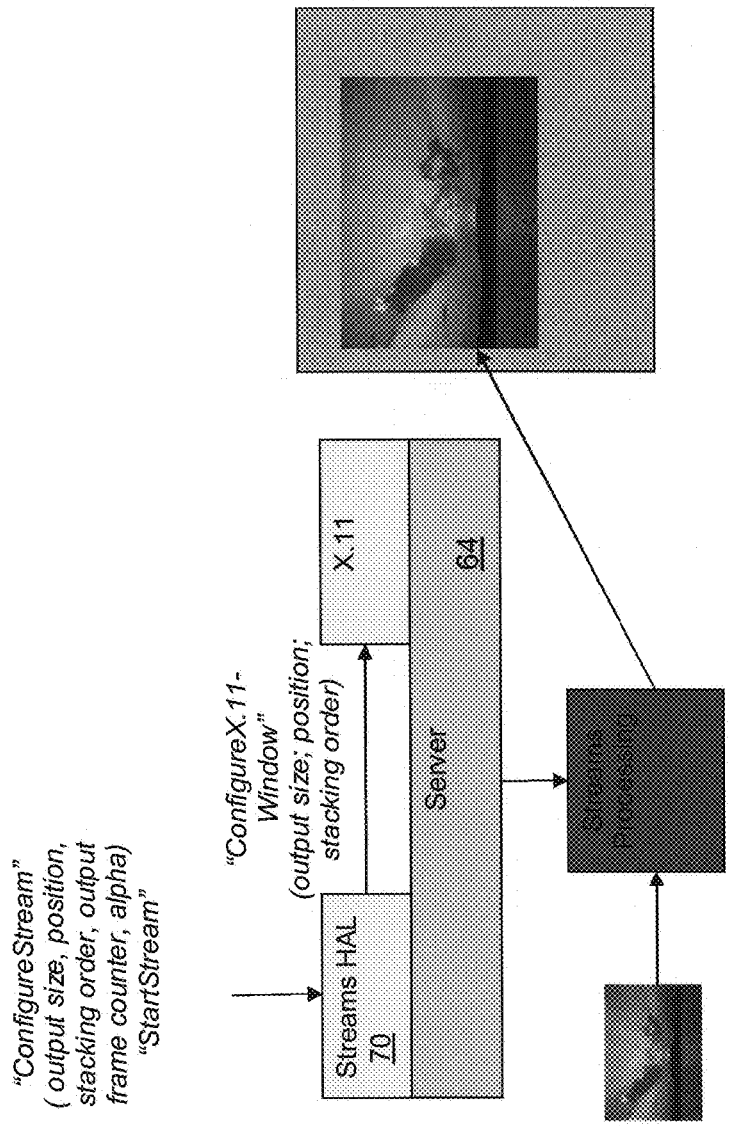
FIG. 20 illustrates co-operation between the streams hardware abstraction layer and the X.11 API in an embodiment of the present invention.

Streams HAL:
"CreateStream"
  opens a stream
  maps stream to X.11 window
  defines input size, color format, ip_address
"ConfigureStream"
  defines output size, position, stacking order, alpha blending, output frame counter
  calls X.11 API to configure X.11 window
"StartStream"
  starts displaying a live stream
"StopStream"
  stops displaying a live stream
  still image or defined bitmap will be visible
"CropStream"
  defines, which part of the has to be used
"DestroyStream"
  closes a stream
  deletes mapping of stream to X.11 window FIG. 20 illustrates the co-operation between Streams HAL 70 and X.11 API in order to display a source with dedicated size on a certain position of the screen.

Implementation of an SVG (scalable vector graphics) interface based on X.11 allows document based rendering according to embodiments of the present invention as an alternative way for external applications to initiate rendering operations on a DGU 14.

X.11 may be provided as a 2D and 3D rendering interface for external applications like the control unit 60 (Media Operating System). Standard X-protocol is supported.

The processing of live streams may be done using the texture engine of the graphic accelerator 44 (eg. P25). OpenGL is preferably used internally as an interface to control texture engine (e.g. Direct3D could be used on a MS Windows based platform). It is integrated within the X.11 server 64 using GLX extension. Streams related commands sent by application via Streams HAL or X.11 API are translated to OpenGL calls which are processed by the graphic accelerator 44 (e.g. P25).

The video FPGA MAC controls the MAC interface within the Video FPGA 48. After sending MAC addresses to the video FPGA 48 main parts of both network protocol and streams processing is done by hardware.

The video FPGA DMA controls the DMA part of the Video FPGA 48. It forwards the streams related graphic accelerator commands, which will be synchronized to the decoded stream and sent to the dedicated streams queues after stream data are transferred to the graphic accelerator 44 (eg. P25).

The loadable Xserver module for the graphical accelerator (e.g. P25-3D) serves the purpose of processing OpenGL commands called via the GLX extension. It uses a direct rendering module (DRM) to access the HW of the graphic accelerator 44. Direct Rendering Module (DRM) is a Linux kernel module (driver), which performs HW access to the graphic accelerator 44 (eg. P25). Standard 2D rendering operations are handled by means of another loadable Xserver module (eg. P25-2D).

Proxy Architecture

Figure 21:
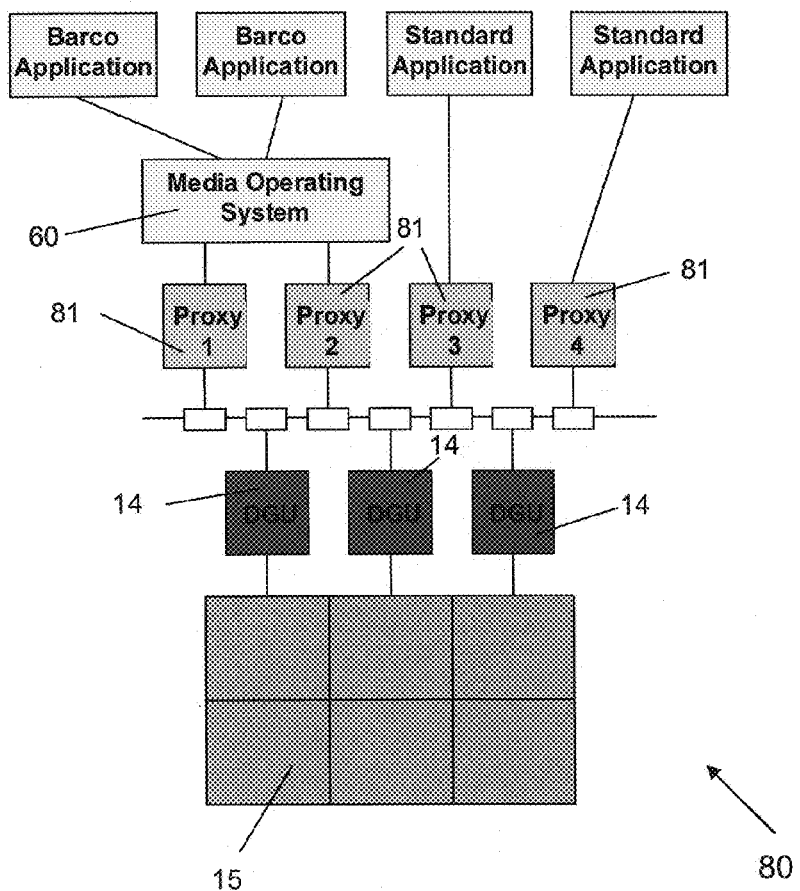
FIG. 21 illustrates a proxy arrangement in accordance with embodiments of the present invention.

The proxy architecture 80 as shown in FIG. 21 allows X11 applications to be used multi-screen without having a single point of failure (fault tolerance). Each proxy server 81 accepts the same calls as the local multi-protocol server and passes them to the dedicated DGUs 14.

A proxy server architecture 80 used to access DGU 14 in accordance with embodiments of the present invention may be a multi-protocol Proxy Server, which supports:

X.11

Streams HAL

SVG, document based rendering

Any application may access DGU resources via the proxy server architecture 80 in order to display their output on the display unit 15. If a standard application is started, the dedicated proxy (proxy 3, proxy 4 in FIG. 21) has to ask the control unit 60 (Media Operating System) for an area on the screen to display its output. Once assigned this is an "exclusive display area" for this application. It can be changed at runtime, but there is no possibility to run a client (window manager), who allows to move these "exclusive display areas" interactively using the mouse pointer. As soon as "exclusive display areas" are used, all changes of position and size have to be controlled by an application (wall management software) based on the control unit 60 (Media Operating System).

Applications (e.g. applications by the owner of the present invention) accessing DGUs 14 via the control unit 60 (Media Operating System) have no need for "exclusive display areas". As long as no other applications are used, it would be possible to run the display wall 54 in interactive mode, where the operator may change window position via mouse pointer. This restriction reduces interactive work with the display wall 54.

In another embodiment, the proxy server architecture may be a multi-screen proxy, in which each proxy server allows an application to perform X.11 calls dedicated to a certain number of DGUs 14, which form a contiguous rendering area. The inherent multi-screen approach is fully transparent to the application. The application sees just one big surface. Proxy servers acting as "multi-screen" X.11 servers can be started several times on several machines within the network. This allows to have one proxy per application or even one application (e.g. "Multimedia Operating System") using several proxies. So, if one machine would crash, this application would not be visible any longer on the display wall, but all other application would keep on running. In that respect this concept is very flexible and fault tolerant.

The control unit 60 (Media Operating System) may use several proxies to achieve fault tolerance. Only one of them is active at a given moment in time and controls the display. Others proxies are operating in hot-stand-by to take over in case of emergency (machine crash). The active proxy controls the complete multi-screen display comprising several DGUs 14.

Software Provided by the Present Invention

Connection Management

The networked display controller architecture as described above is preferably scalable—towards low-end and high-end systems. The network approach—communication methods, choice of protocols, actual devices usable etc. . . . —is to a large extent dependant on the performance of the network 13 in terms of connection and disconnection latency, subscription join and leave latency etc. . . . . Optimization of these parameters is very important towards overall usability (specifications) of the system. For instance: it is preferred to be able to stop a stream very quickly as this means it would be possible to switch rapidly between different streams on a single connection.

Figure 22:
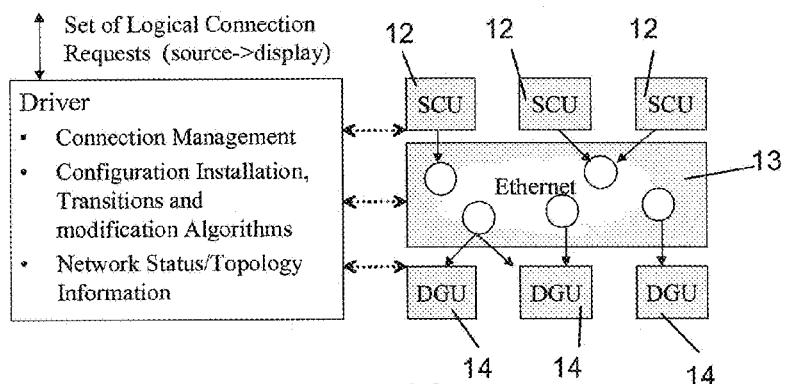
FIG. 22 illustrates the role of network management in an overall architecture in accordance with embodiments of the present invention.

FIG. 22 shows the role of the network management in the overall architecture. The input is a set of logical requests, specifying a set of sources 11 that need to be shown on a given set of display units 15. Each of the connections that are requested corresponds with a bandwidth (which is determined by tuneable encoder parameters such as frame rate and resolution). The resulting packet streams are transported over the Ethernet network 13 connecting encoders 12 (SCUs) and DGUs 14.

The Ethernet network 13 interconnecting encoders 12 (SCUs) and DGUs 14 has several limitations. Two important ones are:

bandwidth: with the advent of 10 Gigabit Ethernet it is technically possible to overprovision the network for the envisaged traffic. Additionally, the requirements towards resilience for some applications put an additional constraint on the available bandwidth (i.e. room must be reserved to reroute traffic).

implementation constraints: even if standards are supported, equipment often puts additional constraints on the connectivity. A typical example would be a limitation of the number of VLANs that are available.

As a result, the driver needs to take these into account when managing the resources of this network. As a first step, it needs to know the actual current topology of the network (which might vary over time due to network failures). Since the Ethernet network 13 should be considered as a black box, it needs to interrogate this network 13 by means of a standardized mechanism (e.g. SNMP management information) to gather this information. By combining this information with knowledge from the end systems (e.g. the MAC addresses of the connected encoders 12 (SCUs) and DGUs 14) the driver can build a full view on the network connectivity (e.g. which equipment is connected to which Ethernet port). If information is not available directly (i.e. number of supported multicast groups on a switch), it can be made available through an additional database of supported equipment. The algorithms for topology detection will then need to link device type information with this database.

Knowing the exact topology of the network, the driver needs to tune encoding parameters in the encoder 12 (SCU) to influence network bandwidth requirements. These parameters will be bounded by a minimal required value, and will have a desired value (both values will need to be part of the request). A priority indication for each of the connections that might depend on the actual application or on the privileges of the operator that wants to use the connection will complement this. This priority will determine which connections get precedence when negotiating for bandwidth.

The request parameters and network constraint together form a complex QoS matching problem. This becomes even more complex when transition scenarios need to be taken into account. In that case, also the transition of one set of connection to another needs to be provisioned when looking at the capacity requirements of the network. This might for instance mean a temporal reduction of video quality to free capacity during the transition.

The connection requests can be in at least two forms:
 a full reconfiguration of the system: in this case a full optimization of the network connections can be made.
 an incremental update (e.g. moving windows): for this a much faster heuristic approach is required Network problems or impossible connection requests need to be detected and propagated upwards to the wall management layer as this layer needs to make decisions on the set of connections to be established if new bottlenecks are showing up.

Different approaches can be taken towards finding a solution to process and deliver the input signals to their destination such as take the first solution found (fastest), try balance network load, try to balance processor load, trying to minimize network load by running as much services as possible on the same processor node. Whatever approach or combination of approaches is chosen—the visual effects of modifying a set of connections should be kept minimal and happen within an acceptable timeframe in order not to disturb the modus operandi of the display wall.

Figure 23:
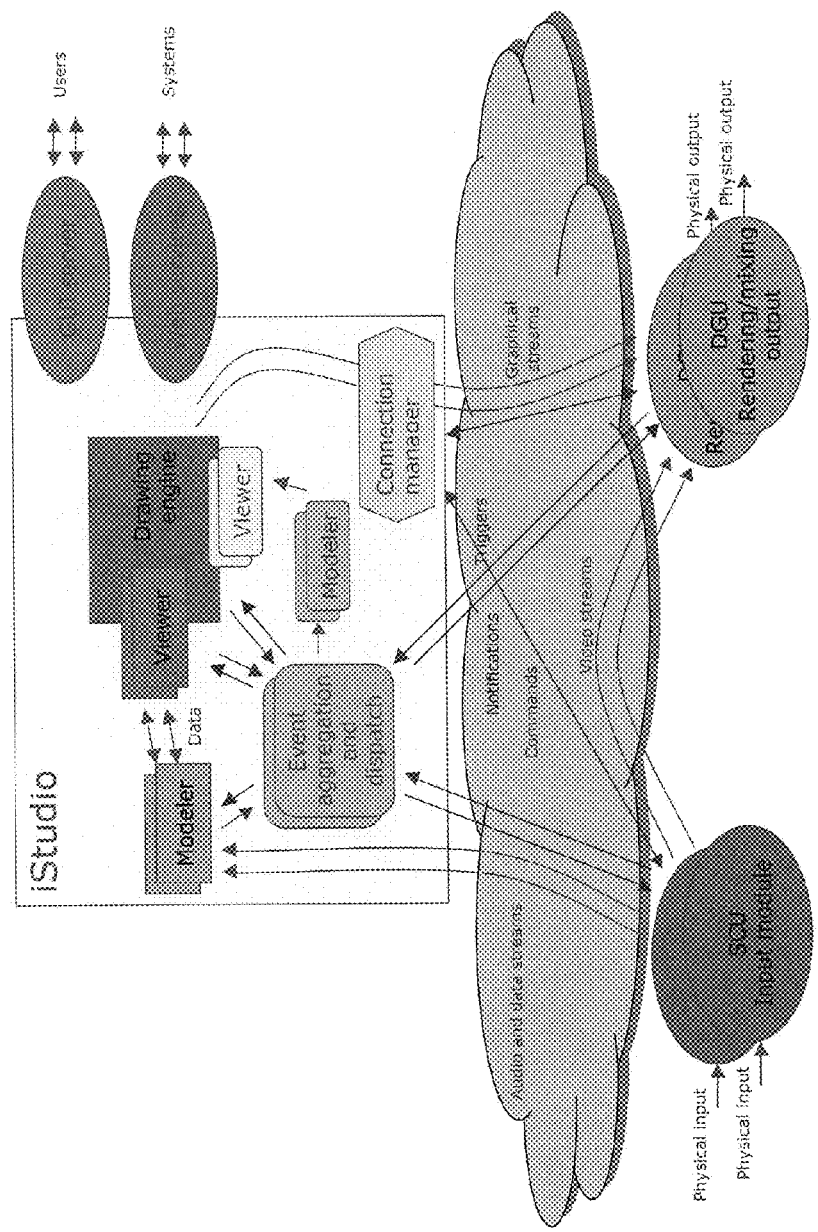
FIG. 23 illustrates iStudioNG application software.

The iStudio control software embodiments are outlined in FIG. 23.

In these embodiments are illustrated the 3 types of streams that will be present in the system: the video streams going from encoders 12 (SCU) to DGU(s) 14, the audio and data streams sent from encoder(s) 12 (SCU(s)) and used by the iStudio control software to create an internal model of the data and finally the graphical stream representing the information to be shown on the DGUs 14. The viewers are showing a representation of a model. The drawing engine draws this representation with help of the DGUs and mixes it with the video streams on the DGU's 14. The connection manager is responsible for setting up and maintaining the needed connectivity in the system. Care has to be taken to minimize the delays introduced by each service in the distributed architecture (e.g. by minimizing real network transfers, by avoiding data copies . . . ) in order to obtain acceptable and predictable overall system latency.

The software is preferably distributed and controllable through a web interface. A UI is provided to demonstrate the product but the normal usage will be by integration into existing broadcast environments using web services. The images generated on each head (display unit 15) of the networked studio are genlocked. For example, all heads can be synchronized on vertical retrace pulses (and/or a possible external genlock reference signal).

Information arriving across the network 13 will at first be buffered to account for network delays and possible jitter. The network 13 being a shared medium, it would be impossible to let a decoder work immediately on the information received without buffering. Using buffering we can guarantee that the decoder 45 will not stall due to lack of information. In practice we expect to always submit a fully received frame. To achieve low latency the size of the buffer has to be kept low.

An information stream representing a single source (eg. SDI stream) or a combined, derived measurement may contain different types of information that may be routed to different endpoints—e.g. audio and video information.

Larger and very loaded networks 13 may require bigger buffers to compensate network delays and jitter. Buffering together with deterministic behavior of the network 13 make it necessary to also provide explicit synchronization of the received frames to make sure that the images shown on different display units 15 are parts of the same frame.

This requires fast and accurate synchronization between the input and output units on the network 13—a tolerance of 10-20 usec would be the maximum allowed. One way of achieving this might be the implementation of the IEEE1588 Precision Time Protocol. The inclusion of this genlock is considered to be part of the framework on top of which the iStudioNG application is built.

The above-described method embodiments of the present invention may be implemented in a system, e.g. a computer processing system as described above. The system includes a plurality of programmable processors coupled to a memory subsystem that includes at least one form of memory, e.g., RAM, ROM, and so forth. It is to be noted that the processor or processors may be a general purpose, or a special purpose processor such as a gaming processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included, as described above. The memory of the memory subsystem 105 may at some time hold part or all of a set of instructions that when executed on the computer processing system implement the steps of the method embodiments described herein. A system that includes the instructions to implement aspects of the methods for obtaining information for or for optimising of the lithographic processing of a substrate is not prior art.

The present invention also includes a computer program product which provides the functionality of any of the methods according to the present invention when executed on a computing device, e.g. as described above. Such computer program product can be tangibly embodied in a machine readable storage medium carrying machine-readable code for execution by a programmable processor. The present invention thus relates to a machine readable storage medium carrying a computer program product that, when executed on computing means, provides instructions for executing any of the methods as described above. The term "machine readable storage medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Further inventions which may be used independently or with the inventions described above are described hereinafter.

Figure 24:
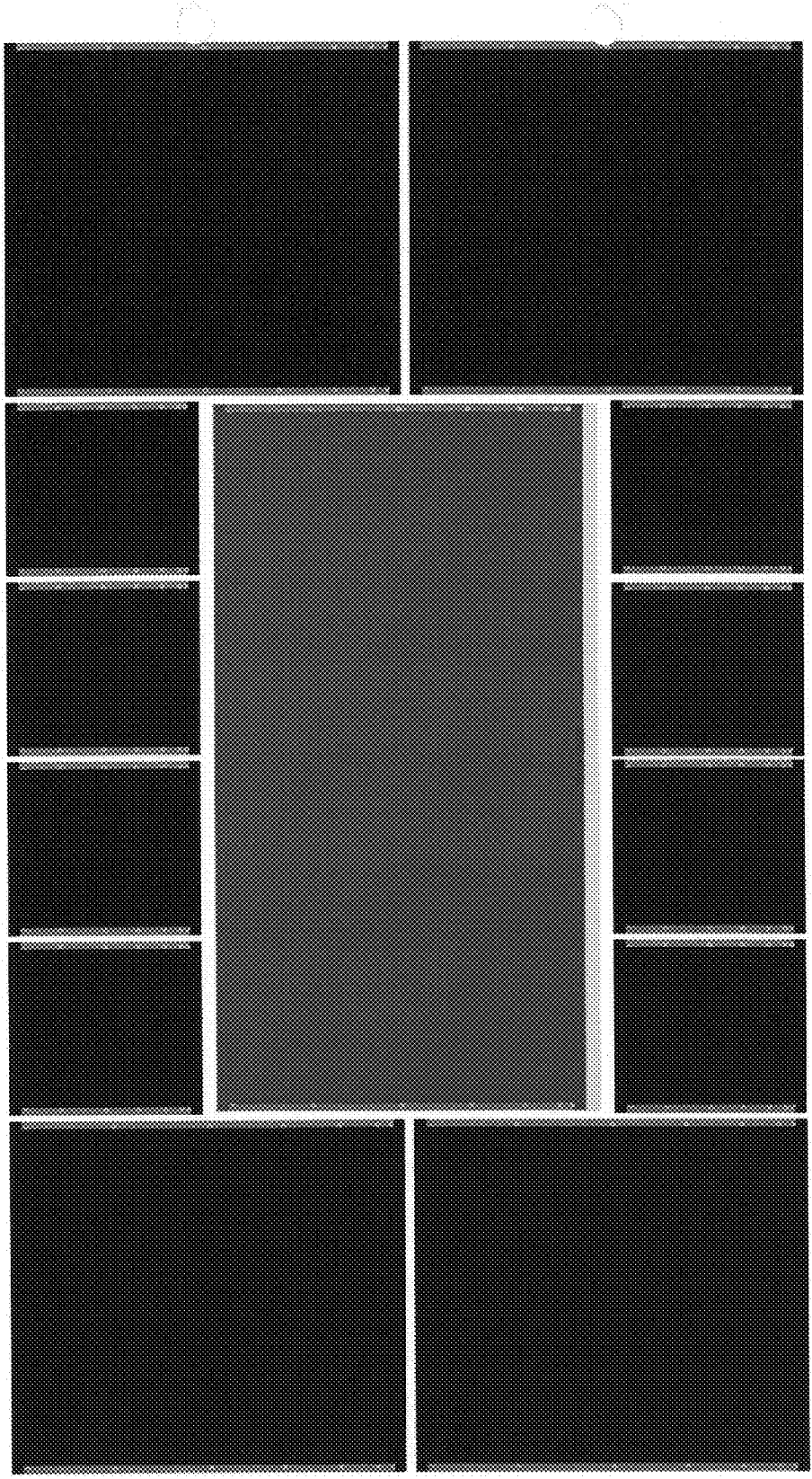
FIG. 24 shows an image described by a configuration document attached.

I) Tagged or Mark Up Language (e.g. XML) Based Content Description for Use in Controlling the Display of Images Using the Above System The use of a tagged mark-up language configuration document 61, such as an XML or SVG document, to provide the definitions for how elements of the above system should deal with each information (e.g. video) stream has many advantages. For example, if each element of the above system has received a tagged language document giving the details of how a video stream is to be displayed, then in case of a fault on one processing device the process can be swapped to another and the information required to process the video stream will be available from the same tagged mark-up language configuration document 61 which has been multicasted or broadcasted around the network 13. Such a configuration document is attached in annex and controls video streams to display an image as shown in FIG. 24.

Display wall processors typically provide the capability to organize the content of the display wall 54. Many (but not all) display wall processors have the capability to store a certain arrangement of content (typically referred to as layout) so that it can later be recalled by simple request. A display processor normally relies on the presence of a central processor to interpret the layout definition and to translate this in the right commands towards the underlying equipment to arrange the content as requested.

Aspects of this invention are twofold:
 the content of a distributed display wall processor is described using a mark up language or tagged language such as SGML or XML description language. A graphics language such as SVG can be used as a subset to describe static and semi-static graphical content but also describing the multimedia sources, typically streaming content, to be inserted
 the fact that the whole mark up language configuration document, e.g. XML description, is distributed for execution towards all display generator units 14, makes them independent from any central processor and allows the display generator units 14 to render different parts of the image in parallel at full speed.

The display generator units define a viewport on the XML description or configuration document 61 to filter out their assigned tasks. Rendering of the graphical content happens in parallel, locally on each of the display generator unitss 14, reading multimedia information allows the display generator unit 14 to fill in the appropriate multimedia content.

According to an embodiment of this invention, one mark up language description, e.g. XML, configuration document 61 of the whole output is provided, i.e. one mark up language configuration document 61 for a large number of display units 15 e.g. in a matrix or an array of display units 15 forming a display wall 54. This configuration document 61 includes data relating to location of all images over the complete display wall 54, spreading of the images over the plurality of display units 15, etc.

At start-up, the single mark-up language configuration description 61 of the whole output—as generated by the drawing engine 82—is distributed to all display generator units 14 for calibration. Each display generator unit 14, knowing the X,Y location of a corresponding display unit 15 in the display wall 54, clips out the area it needs by means of the viewport functionality of the SVG viewer used to render the tagged mark-up language configuration file, and based on the information in the relevant part of the mark up language description 61, subscribes to relevant streams—identified by an SCU unicast IP address or a multicast group IP address— in the network, where it takes the information it needs. Subscription to only a part of the image streams reduces the load on the network 13. Such subscription to only a part of the image streams is possible e.g. when using JPEG2000 as a compression scheme and making the different streams available on different addresses or multicast groups.

It is an advantage of this invention that each display generator unit 14, once calibrated, can act independently. Each display generator unit 14 independently performs the tasks it has to perform to enable the visualisation of image information, although the content of the image information spans over a plurality of display units 15.

Embodiments of the present invention relate to multiple streaming servers serving multiple end-users, each end-user being able of simultaneous handling of multiple streams of the different servers.

II. Redundant Display Wall Processor

Current display walls and their display wall controllers are very vulnerable. Failure of a component can lead to loss of information for the user. This is due to the fact that a display wall processor has typically only one internal transmission infrastructure (bus e.g.), that there is typically only one central processor providing the logic to the complete system, and that outputs have a direct physical connection to a display device. This situation leads to complete duplication of the display wall processor in those circumstances where redundancy is required.

An aspect of this invention lies in an architecture that makes it possible to build a display wall 54 consisting of N display units 15 with N+1 display generator units 14 only with fault tolerance against failure of one of the display generator units 14, even with absent central logic processor.

Figure 25:
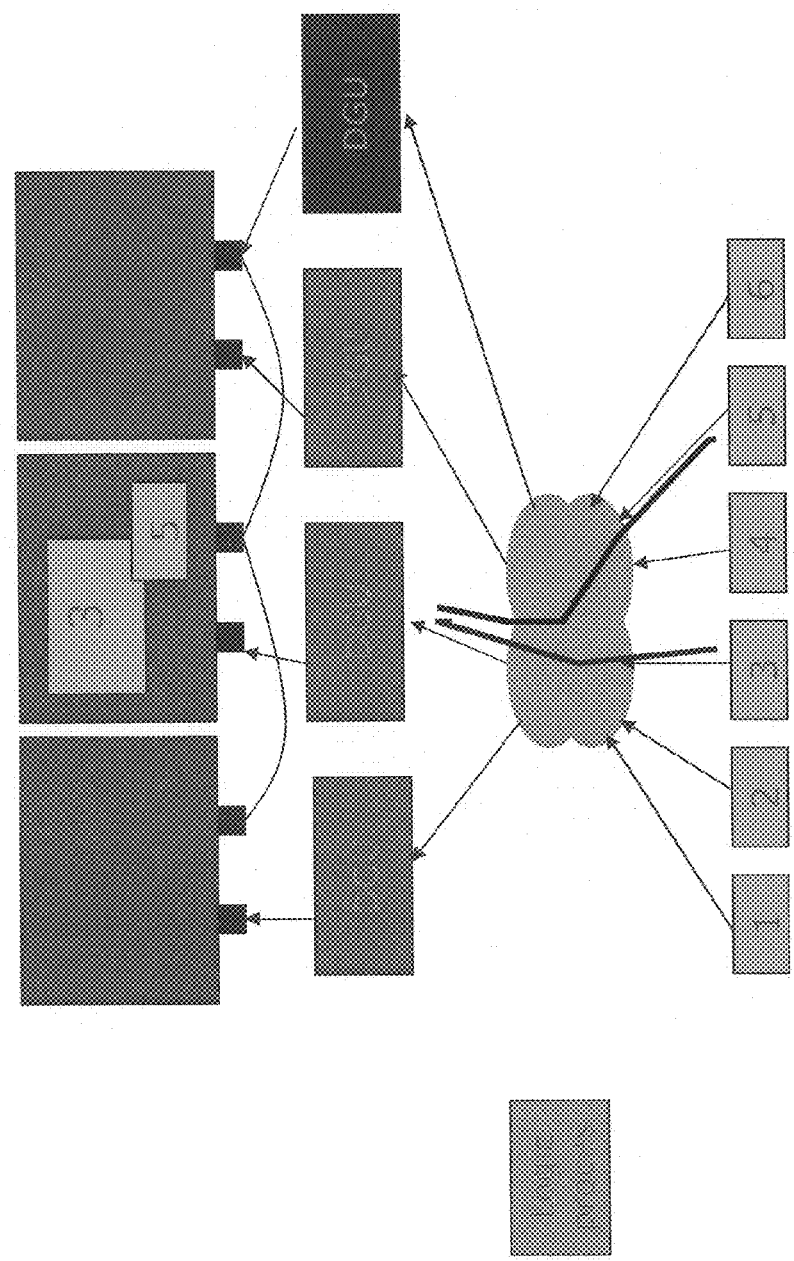
FIGS. 25 and 26 illustrate a system according to embodiments of the present invention, where a redundant display generator unit is present.
Figure 26:
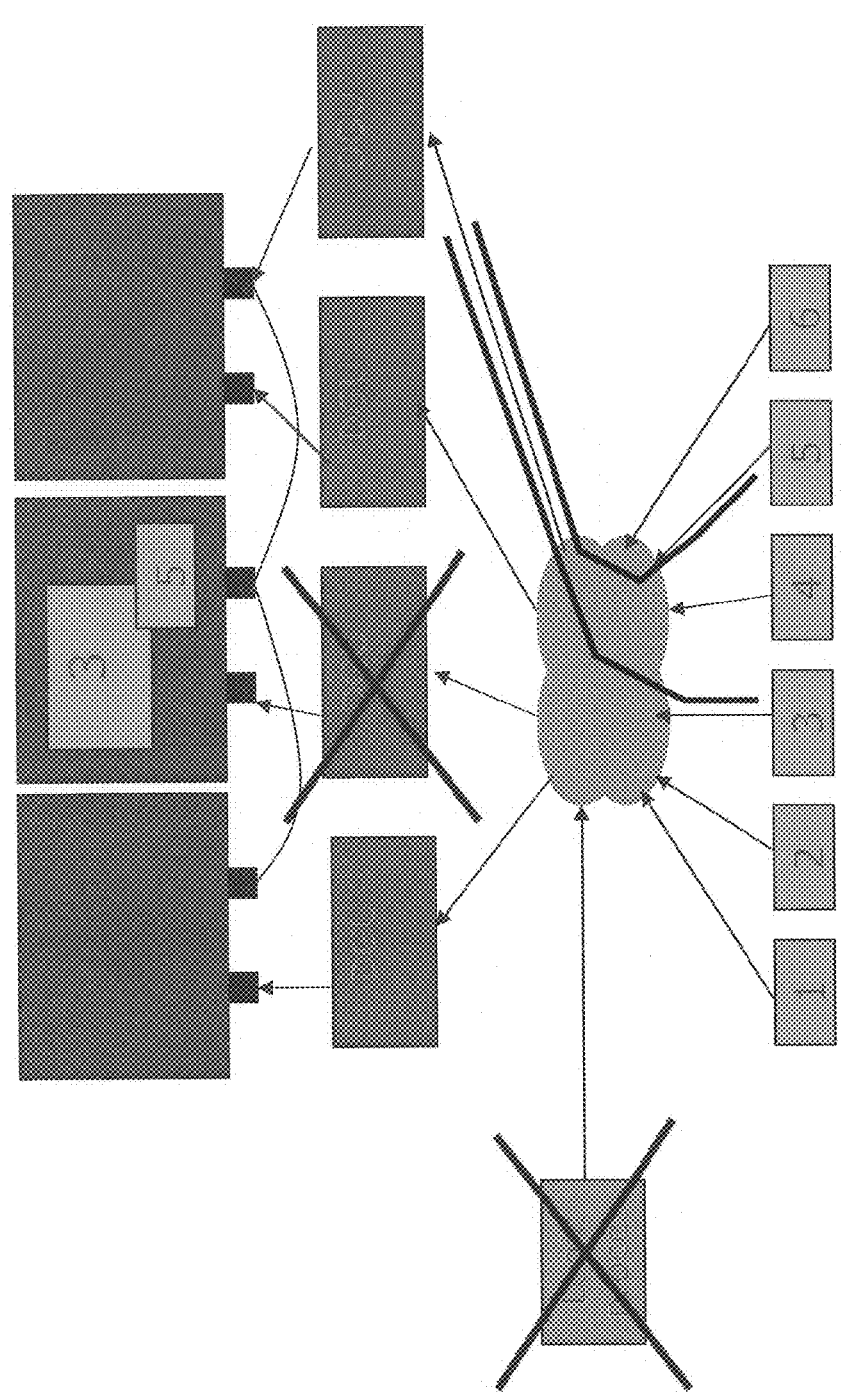

The solution to the above problems comprises, in accordance with this invention:
 each display generator unit 14 having the full description of the content of the display wall 54 (sources, source position, source size, source z-order)
 each display generator unit being capable of defining its active role within the display wall 54
 each display generator unit being capable of subscribing to the sources 11
 each display unit 15 having a loop through connection for the redundant connection
 each display unit 15 being capable of switching between the main connection and the redundant connection When a display generator unit 14 of the display wall processor fails, the extra display generator unit 14 can take over the task of any other due to the fact that that display generator unit 14 holds the whole description of the display wall 54, as described above with regard to the configuration document 61, e.g. mark up language description, and the fact that it can subscribe to the appropriate sources 11 to be displayed while at the same time the display unit 15 can switch to the second input. The second input of all display units 15 is connected to the redundant display generator unit 14. The display generator unit 14 contains sufficient information and is capable of organizing itself in such a way that it can take over the role of any of the other display generator units 14. This is illustrated in FIGS. 25 and 26.

III. Scalable Synchronized Distributed Rendering with Embedded Rendering Priorization, Automatic Load Adaptation and Redundancy Mechanisms.

Matrixes of display units 15 are used to render information when the resolution of a single display is too limited to show the needed content. Images can be sent over the network 15 with a high resolution, e.g. 3000×4000 pixels. If the image is larger than a display unit, the image stream can be split so as to display the image over a plurality of display units 15 in the matrix 54, and each display unit 15 can subscribe only to the part it needs.

In case of such matrices 54 of display units 15, rendering of information on the display matrix 54 (wall) must be synchronized to avoid image tearing and misaligned images across display boundaries. Current architectures use some form of central instance, be it hardware or a software process, to distribute the rendering information and to synchronize the rendering by one or multiple rendering devices. This central instance is a single point of failure and most likely a performance bottleneck when wall size and the amount of information shown gets larger. For performance reasons most central instances will cache information in the rendering devices making an n+1 redundancy scheme on these devices impossible and making hot plugging impossible. When the central instance is becoming a bottleneck the processes delivering the information is normally slowed down to cure the situation.

Aspects of this invention are threefold:
  information sources may use multiple transformation processes correlating, transforming and distributing information to be rendered to the rendering devices. This solves the problem of single point of failure when a single central instance is used and it provides for better scalability of information distribution as it avoids the single central instance becoming a distribution bottleneck.
  The rendering information can be distributed using multiple logical channels. The DGUs 14 can each take rendering information from multiple channels and render it at maximal speed. This solves the problem of 1-to-N scalability between a single (1) central instance that has to feed a large number (N) rendering devices—causing the rendering devices to perform suboptimal. A priority can be assigned to each logical distribution channel (defining the importance of the information shown) to distribute the rendering power across multiple information sources.
  Synchronization of rendering is handled in a distributed way: the rendering devices communicate with one another to determine the parts of the newly rendered image that are fit for displaying. Each DGU renders fully autonomously a dynamically reconfigurable viewport of the image, yielding a simple 'n+1' redundancy scheme on the DGUs. When rendering capacity is being exceeded the rendering will 'throttle down' automatically (as the graphical processor e.g. P25 can't follow) and without effect on the information source. The use of triple buffering makes sure that all information is being refreshed without visual artifacts. Synchronisation is an issue as images shown do not only include video, but also metadata, such as e.g. an audiobar. If such audiobar can be seen across two display units 15, it needs to be synchronised. Therefore rendering of the graphical data needs to be synchronised, and in the end also the graphical data needs to be synchronised with the video.

Figure 27:
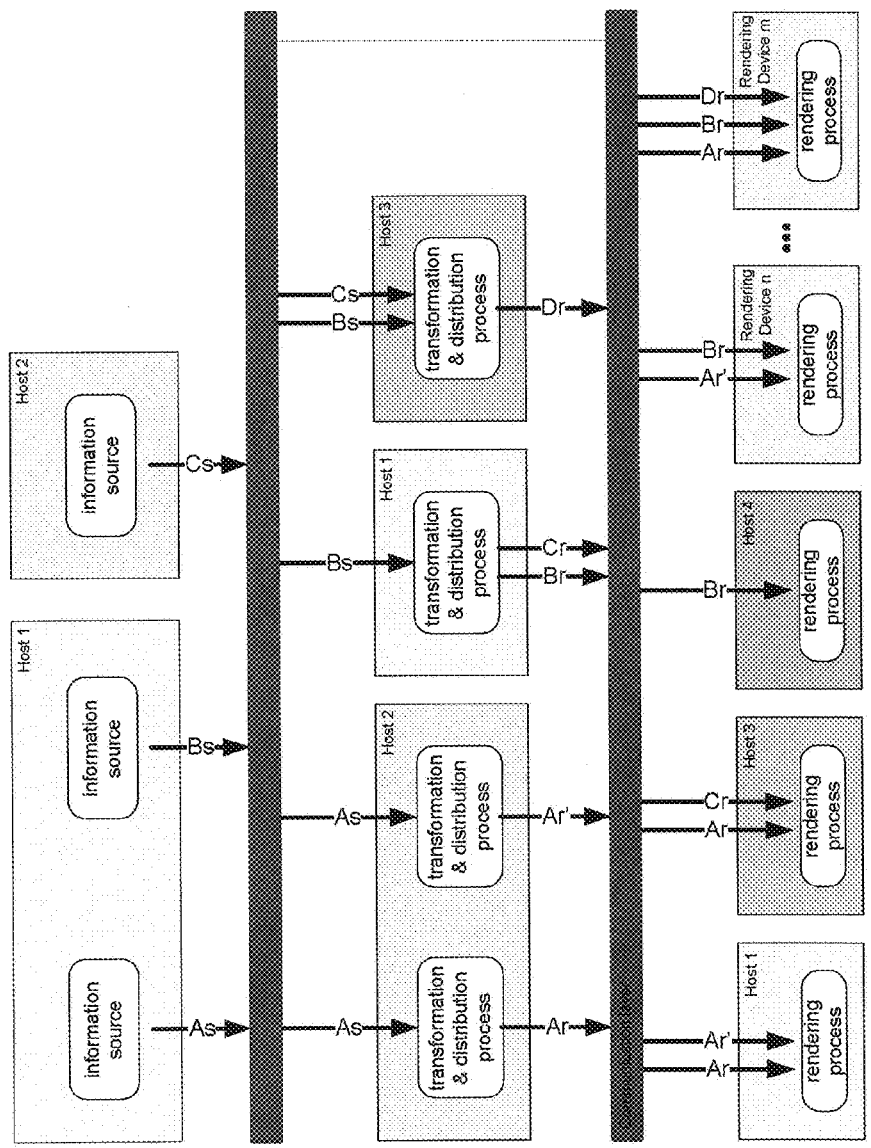
FIG. 27 gives a high-level overview of synchronised distributed rendering in accordance with embodiments of the present invention.

FIG. 27 gives a high level overview of this invention.

IV. Distributed Display Wall Processor

A problem to be solved is how to display a number of visual sources 11 (video, computer graphics, offered in various formats) on a number of control room visualization systems whereby the visualization systems can be multiple and physically separated, whereby each visualization system on itself has a high degree of modularity in that it exists out of a number of display units 15, whereby a source 11 might need to be displayed various times in various sizes (resolutions) or with various quality levels (e.g. limited by bandwidth between source and visualization system), whereby real-time behaviour has to be achieved, real-time defined as an end to end latency below 80 milliseconds.

Figure 28:
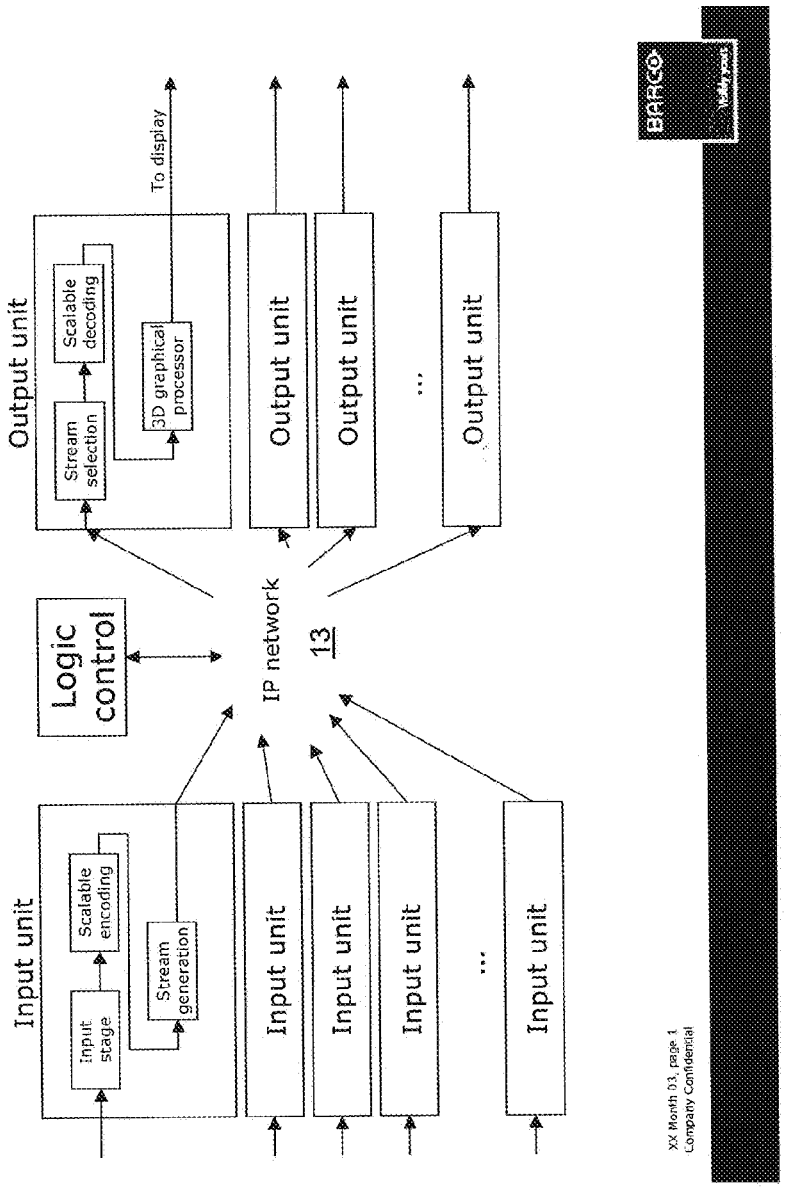
FIG. 28 is a schematic illustration of the distribution layers inside a distributed display wall processor in accordance with embodiments of the present invention.

FIG. 28 is a schematic drawing of this invention.

The distributed display wall processor consists of N input units, M output units and one or more logic control units. All these components use a consumer-of-the-shelve (COTS) (=non-proprietary) IP network 13 to send and receive all control data and all multimedia content.

The aspect of this invention lies in the combination of using a scalable video codec, e.g. based on JPEG2000 on input side, appropriate network stream organization before transmission combined with composing the output based on selecting the right streams and the right elements out of the streams, decode and use a programmable 3D graphical processor to map video textures to the wanted output. The encoding at input side is done to reduce needed bandwidth, to introduce a coarse scaling level (1:1, 1:2, 1:4, 1:16, ...) and to be able to arrange the data in multiple multicast streams in such a way that bandwidth usage is optimal, esp. avoiding clogging of the output units and exploiting the multicast capabilities of the network. The graphical processor at the receiving end does scaling to the exact display size (as many times as needed), and assures correct display order (z-order). The novelty lies also in using standard network equipment for the transmission between inputs and outputs resulting in a control room display processor with the capability of a fault tolerant transmission between inputs and outputs.

Advantages of this invention are as follows:

One-liner: "connect once, display anywhere" is a main advantage and difference.

Current display wall processors are physically constrained between inputs and outputs, signal distribution is always done externally, all processors have limits on how many times a source can be displayed (typically once) or in how many sizes a source can be displayed. All current processors depend on an internal data transmission mechanism resulting in an architecture where the display wall processor is a single point of failure. This is no longer the case in the proposed solution.

The difficulties lie in the amount of data to be processed, addressing the real-time aspect, bandwidth optimization without giving in on quality or latency, network management, frame accurate synchronization of all visual content, the logic control of a distributed system.

Here again, this embodiment of the invention is performed by using a configuration document, e.g. mark up language description, of the whole, distributed system. This mark up language configuration document is read into the multiple display units, which interpret it and act upon it. Each of the display units may display a different format and/or a different quality of image.

For the above embodiments, the mark up language configuration document may be composed by the drawing engine 82 on a central processing device, e.g. a standard PC, and may be distributed from there.

Embodiments of the present invention include distributed commands based on a mark up language document. Such a document is attached in annex and can be used to display the various video streams as shown in FIG. 24.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A display system for displaying streaming image data from a source of video signals on a plurality of display units linked by a network, comprising:
a network processing block that uses a progression mechanism to separate a video signal containing a video frame into multiple streams, said multiple streams each including data that, when combined by a decoder, form an image having a resolution that depends on a number of streams that are being combined and that is less than full-resolution when the number of streams that are being combined is less that the number of streams into which the video frame is divided; and
a plurality of display units linked by the network, each including at least one said decoder,
wherein the networked display units are adapted to selectively subscribe to a number of streams less than said number of streams forming said full resolution image.

2. A display system according to claim 1, wherein the progression mechanism of the network processing block provides rough scaling of the image data to reduce bandwidth for streaming, and final scaling to an exact image size is carried out locally by a display generator unit in each of the networked display units.

3. A display system according to claim 1, wherein each of the display generator units independently carries out final scaling by a configuration document stored in each respective networked display units.

4. A display system according to claim 1, further comprising a control unit for controlling distribution of the configuration document to the display generator units.

5. A display system according to claim 1, wherein a processing means of the display generator units comprises a gaming video processor for rendering the images to be displayed.

6. A display system according to claim 1, wherein a single configuration document is provided for all images to be displayed on the plurality of networked display units.

7. A display system according to claim 1, further comprising encoders for encoding said streaming image data.

8. A display system according to claim 7, wherein the encoders comprise codec logic for compressing data related to images to be displayed.

9. A display system according to claim 8, wherein the codec logic is JPEG2000 logic.

10. A method for displaying streaming image data on a plurality of display units linked by a network having one or more networked display units, comprising the steps of:
using a progression mechanism to separate a video signal containing a video frame into multiple streams, said multiple streams each including data that, when combined by a decoder, form an image having a resolution that depends on a number of streams that are being combined and that is less than full-resolution when the number of streams that are being combined is less that the number of streams into which the video frame is divided; and
a plurality of display units linked by the network selectively subscribing to a number of streams less than said number of streams forming said full resolution image.

11. A method according to claim 10, wherein the progression mechanism of the network processing block provides rough scaling of the image data to reduce bandwidth for streaming, and final scaling to an exact image size is carried out locally by a display generator unit in each of the networked display units.

12. A method according to claim 10, wherein each of the display generator units independently carries out final scaling by a configuration document stored in each respective networked display units.

13. A method according to claim 10, further comprising a control unit for controlling distribution of the configuration document to the display generator units.

14. A method according to claim 10, wherein a processing means of the display generator units comprises a gaming video processor for rendering the images to be displayed.

15. A method according to claim 10, wherein a single configuration document is provided for all images to be displayed on the plurality of networked display units.

16. A method according to claim 10, wherein a step of encoding said streaming image data comprises using codec logic for compressing data related to images to be displayed.

17. A method according to claim 16, wherein the codec logic is JPEG2000 logic.

* * * * *